US012700974B2

(12) United States Patent
Bae et al.

(10) Patent No.: US 12,700,974 B2
(45) Date of Patent: Aug. 4, 2026

(54) METHOD FOR TRANSMITTING HARQ-ACK INFORMATION, USER EQUIPMENT, PROCESSING DEVICE, STORAGE MEDIUM AND COMPUTER PROGRAM, AND HARQ-ACK INFORMATION RECEPTION METHOD AND BASE STATION

(71) Applicant: LG Electronics Inc., Seoul (KR)

(72) Inventors: Duckhyun Bae, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 18/551,771

(22) PCT Filed: Apr. 5, 2022

(86) PCT No.: PCT/KR2022/004850
§ 371 (c)(1),
(2) Date: Sep. 21, 2023

(87) PCT Pub. No.: WO2022/215998
PCT Pub. Date: Oct. 13, 2022

(65) Prior Publication Data
US 2024/0305433 A1      Sep. 12, 2024

Related U.S. Application Data

(60) Provisional application No. 63/312,375, filed on Feb. 21, 2022.

(30) Foreign Application Priority Data

Apr. 5, 2021      (KR) ........................ 10-2021-0044319
Nov. 5, 2021      (KR) ........................ 10-2021-0151684

(51) Int. Cl.
*H04L 5/00*      (2006.01)
*H04L 1/1829*      (2023.01)
(Continued)

(52) U.S. Cl.
CPC .......... *H04L 5/0055* (2013.01); *H04L 1/1861* (2013.01); *H04W 72/11* (2023.01); *H04W 72/23* (2023.01); *H04L 1/1812* (2013.01)

(58) Field of Classification Search
CPC ... H04L 5/0055; H04L 1/1861; H04L 1/1812; H04W 72/11; H04W 72/23
See application file for complete search history.

(56) References Cited

U.S. PATENT DOCUMENTS 12,028,888 B2 *      7/2024      Wang .................... H04L 5/0055
2020/0413425 A1      12/2020      Lin et al.
(Continued)

FOREIGN PATENT DOCUMENTS

JP      2021-520681 A      8/2021
WO      WO 2020/168223 A1      8/2020

OTHER PUBLICATIONS

Extended European Search Report in European Appln. No. 22784907.2, mailed on Mar. 21, 2025, 9 pages.
(Continued)

*Primary Examiner* — Michael J Moore, Jr.
(74) *Attorney, Agent, or Firm* — Fish & Richardson P.C.

(57)      ABSTRACT

A UE can receive a first PDSCH on the basis of first scheduling information related to a first priority, receive a second PDSCH on the basis of second scheduling information related to a second priority, generate first HARQ-ACK information having the first priority on the basis of the reception of the first PDSCH, generate second HARQ-ACK information having the second priority on the basis of the reception of the second PDSCH, defer the transmission of
(Continued)

the first HARQ-ACK having the first priority to a third slot on the basis that the transmission of a first HARQ-ACK for the first PDSCH overlaps with a downlink symbol in a first slot determined on the basis of a first PDSCH-to-HARQ-ACK_feedback timing value for the first PDSCH, and defer the transmission of a second HARQ-ACK having the second priority to a fourth slot on the basis that the transmission of the second HARQ-ACK overlaps with a downlink symbol in a second slot determined on the basis of a second PDSCH-to-HARQ-ACK_feedback timing value for the second PDSCH.

15 Claims, 15 Drawing Sheets

(51) Int. Cl.
  *H04W 72/11*     (2023.01)
  *H04W 72/23*     (2023.01)
  *H04L 1/1812*    (2023.01)

(56)              References Cited

U.S. PATENT DOCUMENTS

| | | | |
|---|---|---|---|
| 2022/0103304 A1* | 3/2022 | Elshafie | H04L 5/0094 |
| 2023/0198679 A1* | 6/2023 | Bae | H04L 5/0055 |
| | | | 370/329 |
| 2023/0224100 A1* | 7/2023 | Bae | H04L 1/1854 |
| | | | 370/329 |
| 2024/0031070 A1* | 1/2024 | Jung | H04W 72/232 |
| 2024/0146468 A1* | 5/2024 | Wang | H04L 5/001 |
| 2024/0187141 A1* | 6/2024 | Ying | H04L 1/1854 |
| 2024/0381366 A1* | 11/2024 | Chien | H04W 72/11 |

OTHER PUBLICATIONS

Moderator (Nokia), "Moderator summary #1 on HARQ-ACK feedback enhancements for NR Rel-17 URLLC/IIoT (AI 8.3.1.1)," R1-2101817, 3GPP TSG-RAN WG1 Meeting #104-e, e-Meeting, Jan. 25-Feb. 5, 2021, 50 pages.

Nokia, Nokia Shanghai Bell, "HARQ-ACK Feedback Enhancements for URLLC/IIoT," R1-2100728, 3GPP TSG RAN WG1 #104-e, e-Meeting, Jan. 25-Feb. 5, 2020, 16 pages.

Nokia, "Final moderator summary on HARQ-ACK feedback enhancements for NR Rel-17 URLLC/IIoT," R1-2110562, 3GPP TSG RAN WG1, Meeting #106bis-e, e-Meeting, Oct. 11-19, 2021, 269 pages.

Office Action in Japanese Appln. No. 2023-561106, mailed on Oct. 1, 2024, 9 pages (with English translation).

Oppo, "Enhancements on intra-UE multiplexing/prioritization," R1-2109096, 3GPP TSG RAN WG1, #106bis-e, e-Meeting, Oct. 11-19, 2021, 10 pages.

Qualcomm Incorporated, "HARQ-ACK enhancement for IOT and URLLC," R1-2110178, 3GPP TSG RAN WG1, #106bis-e, e-Meeting, Oct. 11-19, 2021, 36 pages.

TCL Communication, "UE feedback enhancements for HARQ-ACK," R1-2107833, 3GPP TSG RAN WG1, Meeting #106-e, e-Meeting, Aug. 16-27, 2021, 6 pages.

Moderator (Nokia), "Moderator summary #2 on HARQ-ACK feedback enhancements for NR Rel-17 URLLC/IIoT," R1-2101818, 3GPP TSG-RAN WG1 Meeting #104-e, e-Meeting, Jan. 25-Feb. 5, 2021, 175 pages.

Office Action in Korean Appln. No. 10-2023-7030794, mailed on Mar. 12, 2026, 11 pages (with English translation).

ZTE, "Discussion on HARQ-ACK enhancements for eURLLC," R1-2100101, 3GPP TSG RAN WG1 Meeting #104-e, e-Meeting, Jan. 25-Feb. 5, 2021, 14 pages.

* cited by examiner

FIG. 1

DL assingment-to-PDSCH offset (K0)

PDCCH slot

PDSCH

PUCCH

PDSCH-to-HARQ-ACK reporting offset (K1)

PUSCH DM-RS

HARQ-ACK RE

CSI part 1

CSI part 2

UL-SCH

Determine to defer transmissions of HARQ-ACK information with different priorities. — S1701

Determine target slot(s) for deferred HARQ-ACK information. — S1703

Transmit deferred HARQ-ACK information in target slot(s)/ — S1705

Transmit PDSCH. — S1801

Determine to defer PUCCH for PDSCH from slot m to slot n. — S1803

Receive multiplexed UL transmission in slot n. — S1805

| Determine to defer receptions of HARQ-ACK information with different priorities. | S1901 |

Determine target slot(s) for deferred HARQ-ACK information. — S1903

Receive deferred HARQ-ACK information in target slot(s)/ — S1905

METHOD FOR TRANSMITTING HARQ-ACK INFORMATION, USER EQUIPMENT, PROCESSING DEVICE, STORAGE MEDIUM AND COMPUTER PROGRAM, AND HARQ-ACK INFORMATION RECEPTION METHOD AND BASE STATION

CROSS-REFERENCE TO RELATED APPLICATIONS

This application is a National Stage application under 35 U.S.C. § 371 of International Application No. PCT/KR2022/004850, filed on Apr. 5, 2022, which claims the benefit of U.S. Provisional Application No. 63/312,375, filed on Feb. 21, 2022, and Korean Application Nos. 10-2021-0151684, filed on Nov. 5, 2021, and 10-2021-0044319, filed on Apr. 5, 2021. The disclosures of the prior applications are incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

It is necessary to properly define how to transmit HARQ-ACK information of different priorities depending on various scenarios.

The objects to be achieved with the present disclosure are not limited to what has been particularly described hereinabove and other objects not described herein will be more clearly understood by persons skilled in the art from the following detailed description.

In an aspect of the present disclosure, there is provided a method of transmitting, by a user equipment (UE), hybrid automatic repeat request-acknowledgement (HARQ-ACK) information in a wireless communication system. The method may include: receiving first scheduling information related to a first priority and second scheduling information related to a second priority, wherein the second priority is higher than the first priority; receiving a first physical downlink shared channel (PDSCH) based on the first scheduling information; receiving a second PDSCH based on the second scheduling information; generating first HARQ-ACK information with the first priority based on receiving the first PDSCH; generating second HARQ-ACK information with the second priority based on receiving the second PDSCH; determining a first slot for transmitting the first HARQ-ACK information based on a first PDSCH-to-HARQ-ACK_feedback timing value for the first PDSCH; determining a second slot for transmitting the second HARQ-ACK information based on a second PDSCH-to-HARQ-ACK_feedback timing value for the second PDSCH; based on the transmission of the first HARQ-ACK information overlapping with a downlink symbol in the first slot, deferring the transmission of the first HARQ-ACK information with the first priority to a third slot, wherein the third slot is later in time than the first slot; and based on the transmission of the second HARQ-ACK information overlapping with a downlink symbol in the second slot, deferring the transmission of the second HARQ-ACK information with the second priority to a fourth slot, wherein the fourth slot is later in time than the second slot.

In another aspect of the present disclosure, there is provided a UE configured to transmit HARQ-ACK information in a wireless communication system. The UE may include: at least one transceiver; at least one processor; and at least one computer memory operably connected to the at least one processor and configured to store instructions that, when executed, cause the at least one processor to perform operations. The operations may include: receiving a first PDSCH based on the first scheduling information; receiving a second PDSCH based on the second scheduling information; generating first HARQ-ACK information with the first priority based on receiving the first PDSCH; generating second HARQ-ACK information with the second priority based on receiving the second PDSCH; determining a first slot for transmitting the first HARQ-ACK information based on a first PDSCH-to-HARQ-ACK_feedback timing value for the first PDSCH; determining a second slot for transmitting the second HARQ-ACK information based on a second PDSCH-to-HARQ-ACK_feedback timing value for the second PDSCH; based on the transmission of the first HARQ-ACK information overlapping with a downlink symbol in the first slot, deferring the transmission of the first HARQ-ACK information with the first priority to a third slot, wherein the third slot is later in time than the first slot; and based on the transmission of the second HARQ-ACK information overlapping with a downlink symbol in the second slot, deferring the transmission of the second HARQ-ACK information with the second priority to a fourth slot, wherein the fourth slot is later in time than the second slot.

In another aspect of the present disclosure, there is provided a processing device. The processing device may include: at least one processor; and at least one computer memory operably connected to the at least one processor and configured to store instructions that, when executed, cause the at least one processor to perform operations. The operations may include: receiving a first PDSCH based on the first scheduling information; receiving a second PDSCH based on the second scheduling information; generating first HARQ-ACK information with the first priority based on receiving the first PDSCH; generating second HARQ-ACK information with the second priority based on receiving the second PDSCH; determining a first slot for transmitting the first HARQ-ACK information based on a first PDSCH-to-HARQ-ACK_feedback timing value for the first PDSCH; determining a second slot for transmitting the second HARQ-ACK information based on a second PDSCH-to-HARQ-ACK_feedback timing value for the second PDSCH; based on the transmission of the first HARQ-ACK information overlapping with a downlink symbol in the first slot, deferring the transmission of the first HARQ-ACK information with the first priority to a third slot, wherein the third slot is later in time than the first slot; and based on the transmission of the second HARQ-ACK information overlapping with a downlink symbol in the second slot, deferring the transmission of the second HARQ-ACK information with the second priority to a fourth slot, wherein the fourth slot is later in time than the second slot.

In another aspect of the present disclosure, there is provided a computer-readable storage medium. The computer-readable storage medium may be configured to store at least one computer program including instructions that, when executed by at least one processor, cause the at least one processor to perform operations for a UE. The operations may include: receiving a first PDSCH based on the first scheduling information; receiving a second PDSCH based on the second scheduling information; generating first HARQ-ACK information with the first priority based on receiving the first PDSCH; generating second HARQ-ACK information with the second priority based on receiving the second PDSCH; determining a first slot for transmitting the first HARQ-ACK information based on a first PDSCH-to-HARQ-ACK_feedback timing value for the first PDSCH; determining a second slot for transmitting the second HARQ-ACK information based on a second PDSCH-to-HARQ-ACK_feedback timing value for the second PDSCH; based on the transmission of the first HARQ-ACK information overlapping with a downlink symbol in the first slot, deferring the transmission of the first HARQ-ACK information with the first priority to a third slot, wherein the third slot is later in time than the first slot; and based on the transmission of the second HARQ-ACK information overlapping with a downlink symbol in the second slot, deferring the transmission of the second HARQ-ACK information with the second priority to a fourth slot, wherein the fourth slot is later in time than the second slot.

In another aspect of the present disclosure, there is provided a computer program stored in a computer-readable storage medium. The computer program may include at least one program code including instructions that, when executed, cause at least one processor to perform operations. The operations may include: receiving a first PDSCH based on the first scheduling information; receiving a second PDSCH based on the second scheduling information; generating first HARQ-ACK information with the first priority based on receiving the first PDSCH; generating second HARQ-ACK information with the second priority based on receiving the second PDSCH; determining a first slot for transmitting the first HARQ-ACK information based on a first PDSCH-to-HARQ-ACK_feedback timing value for the first PDSCH; determining a second slot for transmitting the second HARQ-ACK information based on a second PDSCH-to-HARQ-ACK_feedback timing value for the second PDSCH; based on the transmission of the first HARQ-ACK information overlapping with a downlink symbol in the first slot, deferring the transmission of the first HARQ-ACK information with the first priority to a third slot, wherein the third slot is later in time than the first slot; and based on the transmission of the second HARQ-ACK information overlapping with a downlink symbol in the second slot, deferring the transmission of the second HARQ-ACK information with the second priority to a fourth slot, wherein the fourth slot is later in time than the second slot.

In another aspect of the present disclosure, there is provided a method of receiving, by a base station (BS), HARQ-ACK information in a wireless communication system. The method may include: transmitting first scheduling information related to a first priority and second scheduling information related to a second priority to a UE, wherein the second priority is higher than the first priority; transmitting a first PDSCH to the UE based on the first scheduling information; transmitting a second PDSCH to the UE based on the second scheduling information; determining a first slot for receiving first HARQ-ACK information with the first priority for the first PDSCH based on a first PDSCH-to-HARQ-ACK_feedback timing value for the first PDSCH; determining a second slot for receiving second HARQ-ACK information with the second priority for the second PDSCH based on a second PDSCH-to-HARQ-ACK_feedback timing value for the second PDSCH; based on the reception of the first HARQ-ACK information overlapping with a downlink symbol in the first slot, deferring the reception of the first HARQ-ACK information with the first priority to a third slot, wherein the third slot is later in time than the first slot; and based on the reception of the second HARQ-ACK information overlapping with a downlink symbol in the second slot, deferring the reception of the second HARQ-ACK information with the second priority to a fourth slot, wherein the fourth slot is later in time than the second slot.

In a further aspect of the present disclosure, there is provided a BS configured to receive HARQ-ACK information in a wireless communication system. The BS may include: at least one transceiver; at least one processor; and at least one computer memory operably connected to the at least one processor and configured to store instructions that, when executed, cause the at least one processor to perform operations. The operations may include: transmitting first scheduling information related to a first priority and second scheduling information related to a second priority to a UE, wherein the second priority is higher than the first priority; transmitting a first PDSCH to the UE based on the first scheduling information; transmitting a second PDSCH to the UE based on the second scheduling information; determining a first slot for receiving first HARQ-ACK information with the first priority for the first PDSCH based on a first PDSCH-to-HARQ-ACK_feedback timing value for the first PDSCH; determining a second slot for receiving second HARQ-ACK information with the second priority for the second PDSCH based on a second PDSCH-to-HARQ-ACK_feedback timing value for the second PDSCH; based on the reception of the first HARQ-ACK information overlapping with a downlink symbol in the first slot, deferring the reception of the first HARQ-ACK information with the first priority to a third slot, wherein the third slot is later in time than the first slot; and based on the reception of the second HARQ-ACK information overlapping with a downlink symbol in the second slot, deferring the reception of the second HARQ-ACK information with the second priority to a fourth slot, wherein the fourth slot is later in time than the second slot.

In each aspect of the present disclosure, each of the first PDSCH and the second PDSCH may be a semi-persistent scheduling based PDSCH.

In each aspect of the present disclosure, for the UE, processing device, computer-readable (non-transitory) storage medium, and/or computer program product, the operations may include determining, as the third slot, an earliest slot in which a first physical uplink channel for HARQ-ACK information with the first priority including the first HARQ-ACK information does not overlap with a downlink symbol. For the BS, processing device, computer-readable (non-transitory) storage medium, and/or computer program product, the operations may include determining, as the third slot, an earliest slot in which a first physical uplink channel for HARQ-ACK information with the first priority including the first HARQ-ACK information does not overlap with a downlink symbol.

In each aspect of the present disclosure, the first physical uplink channel may be a physical uplink control channel (PUCCH) for a semi-persistent scheduling configuration related to the first PDSCH.

In each aspect of the present disclosure, for the UE, processing device, computer-readable (non-transitory) storage medium, and/or computer program product, the operations may include: based on the third slot being identical to the fourth slot, determining a third physical uplink channel for multiplexing the first HARQ-ACK information and the second HARQ-ACK information; and based on the third physical uplink channel not overlapping with a downlink symbol, transmitting the first HARQ-ACK information and the second HARQ-ACK information over the third physical uplink channel in the third slot. For the BS, processing device, computer-readable (non-transitory) storage medium, and/or computer program product, the operations may include: based on that the third slot is identical to the fourth slot, determining a third physical uplink channel for multiplexing the first HARQ-ACK information and the second HARQ-ACK information; and based on the third physical uplink channel not overlapping with a downlink symbol, receiving the first HARQ-ACK information and the second HARQ-ACK information over the third physical uplink channel in the third slot.

In each aspect of the present disclosure, the third physical uplink channel may be determined based on a number of bits in the first and second HARQ-ACK information and a PUCCH configuration for the second priority.

In each aspect of the present disclosure, the operations may include determining, as the third slot, an earliest slot in which a first physical uplink channel for HARQ-ACK information with the first priority including the first HARQ- ACK information does not overlap with a downlink symbol and the first physical uplink channel does not overlap in time with a second physical uplink channel with the second priority.

The foregoing solutions are merely a part of the examples of the present disclosure and various examples into which the technical features of the present disclosure are incorporated may be derived and understood by persons skilled in the art from the following detailed description.

According to some implementations of the present disclosure, a wireless communication signal may be efficiently transmitted/received. Accordingly, the total throughput of a wireless communication system may be raised.

According to some implementations of the present disclosure, various services with different requirements may be efficiently supported in a wireless communication system.

According to some implementations of the present disclosure, delay/latency generated during radio communication between communication devices may be reduced.

According to some implementations of the present disclosure, hybrid automatic repeat request-acknowledgement (HARQ-ACK) deferral may also be performed for HARQ-ACK transmissions of different priorities.

According to some implementations of the present disclosure, slot(s) which HARQ-ACK transmissions of different priorities are differed to and transmitted in may be determined.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 1 illustrates an example of a communication system 1 to which implementations of the present disclosure are applied;

FIG. 14 illustrates exemplary HARQ-ACK deferral;

DETAILED DESCRIPTION

Figure 2:
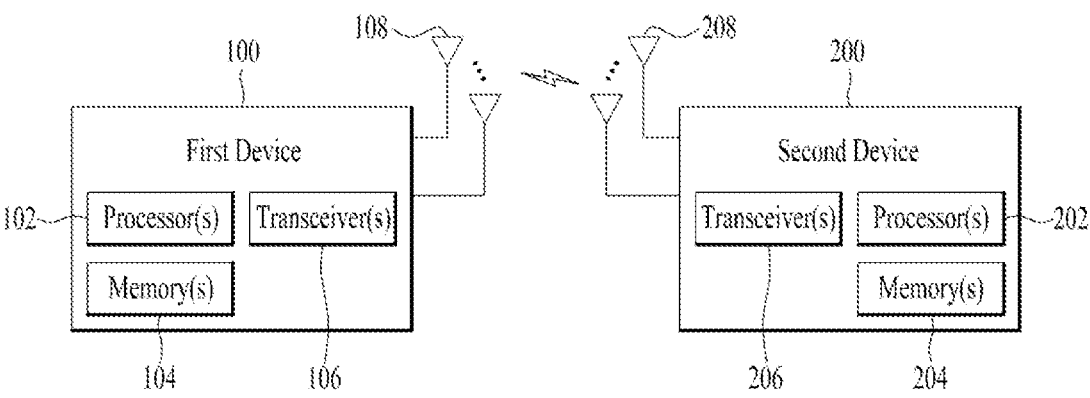
FIG. 2 is a block diagram illustrating examples of communication devices capable of performing a method according to the present disclosure.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (DL PCC). A carrier corresponding to the Scell on DL is referred to as a downlink secondary CC (DL SCC), and a carrier corresponding to the Scell on UL is referred to as an uplink secondary CC (UL SCC).

In a dual connectivity (DC) operation, the term SpCell refers to a Pcell of a master cell group (MCG) or a Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes the PSCell and 0 or more Scells. The PSCell is a primary Scell of the SCG. For a UE in RRC_CONNECTED state, that is not configured with CA or DC, only one serving cell including only the Pcell is present. For a UE in RRC_CONNECTED state, that is configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

For a UE that is configured with CA and is not configured with DC, a Pcell PUCCH group including the Pcell and 0 or more Scells and an Scell PUCCH group including only Scell(s) may be configured. For the Scell, an Scell on which a PUCCH associated with the corresponding cell is transmitted (hereinafter, a PUCCH cell) may be configured. An Scell for which a PUCCH Scell is indicated belongs to the Scell PUCCH group and PUCCH transmission of related uplink control information (UCI) is performed on the PUCCH Scell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PC-FICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, a PDCCH refers to a set of time-frequency resources (e.g., resource elements (REs)) carrying downlink control information (DCI), and a PDSCH refers to a set of time-frequency resources carrying DL data. A PUCCH, a PUSCH, and a PRACH refer to a set of time-frequency resources carrying UCI, a set of time-frequency resources carrying UL data, and a set of time-frequency resources carrying random access signals, respectively. In the following description, "the UE transmits/receives a PUCCH/PUSCH/PRACH" is used as the same meaning that the UE transmits/receives the UCI/UL data/random access signals on or through the PUCCH/PUSCH/PRACH, respectively. In addition, "the BS transmits/receives a PBCH/PDCCH/PDSCH" is used as the same meaning that the BS transmits the broadcast information/DCI/DL data on or through a PBCH/PDCCH/PDSCH, respectively.

In the present disclosure, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives a synchronization signal block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

Figure 1:
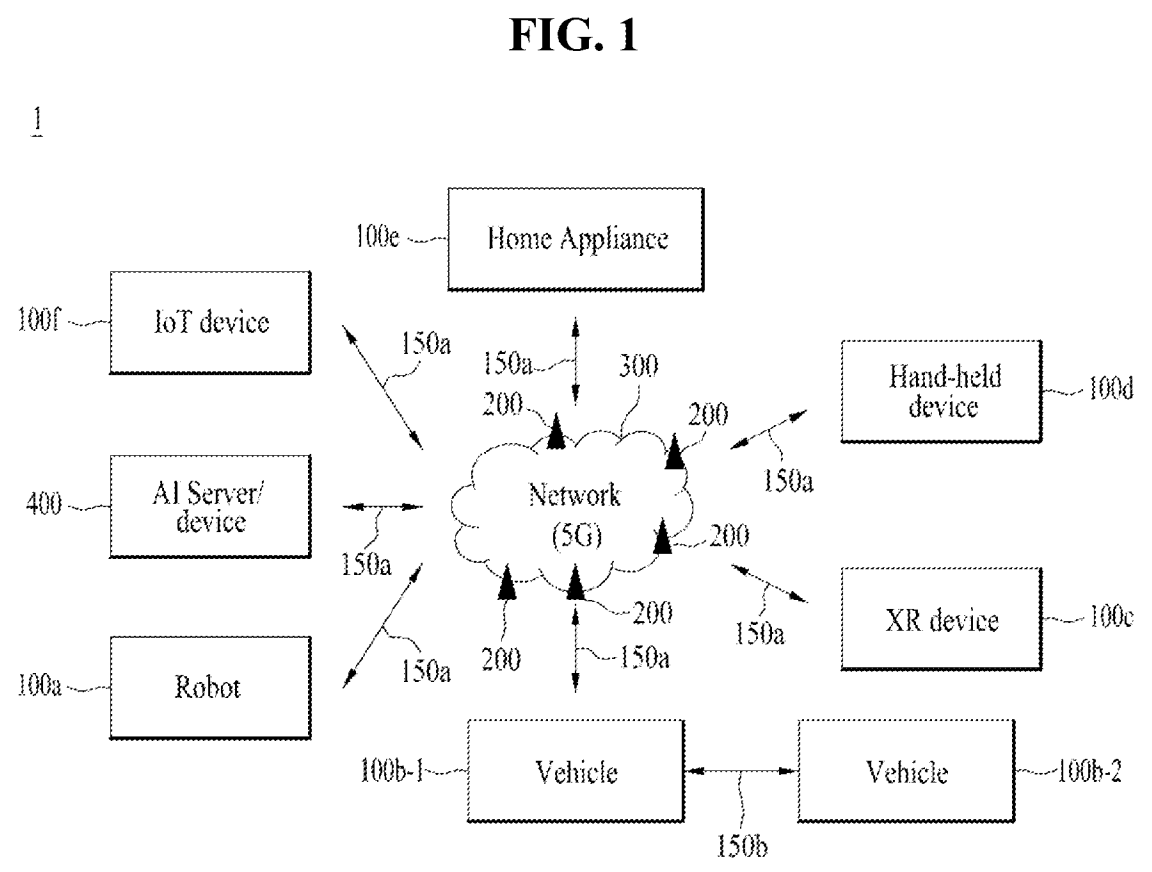

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
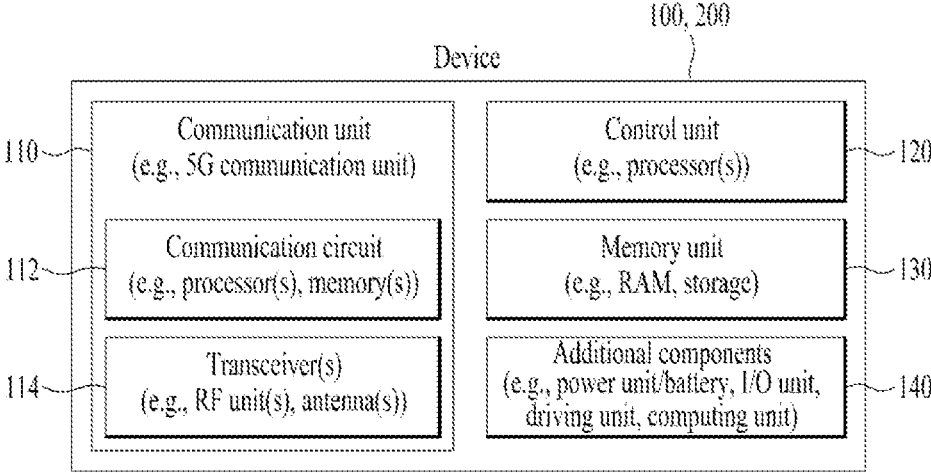
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit

120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-transitory memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-transitory) storage medium and, when executed, configured to perform operations according to some implementations of the present disclosure or cause at least one processor to perform the operations according to some implementations of the present disclosure. The computer program may be provided in the form of a computer program product.

The computer program product may include at least one computer-readable (non-transitory) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
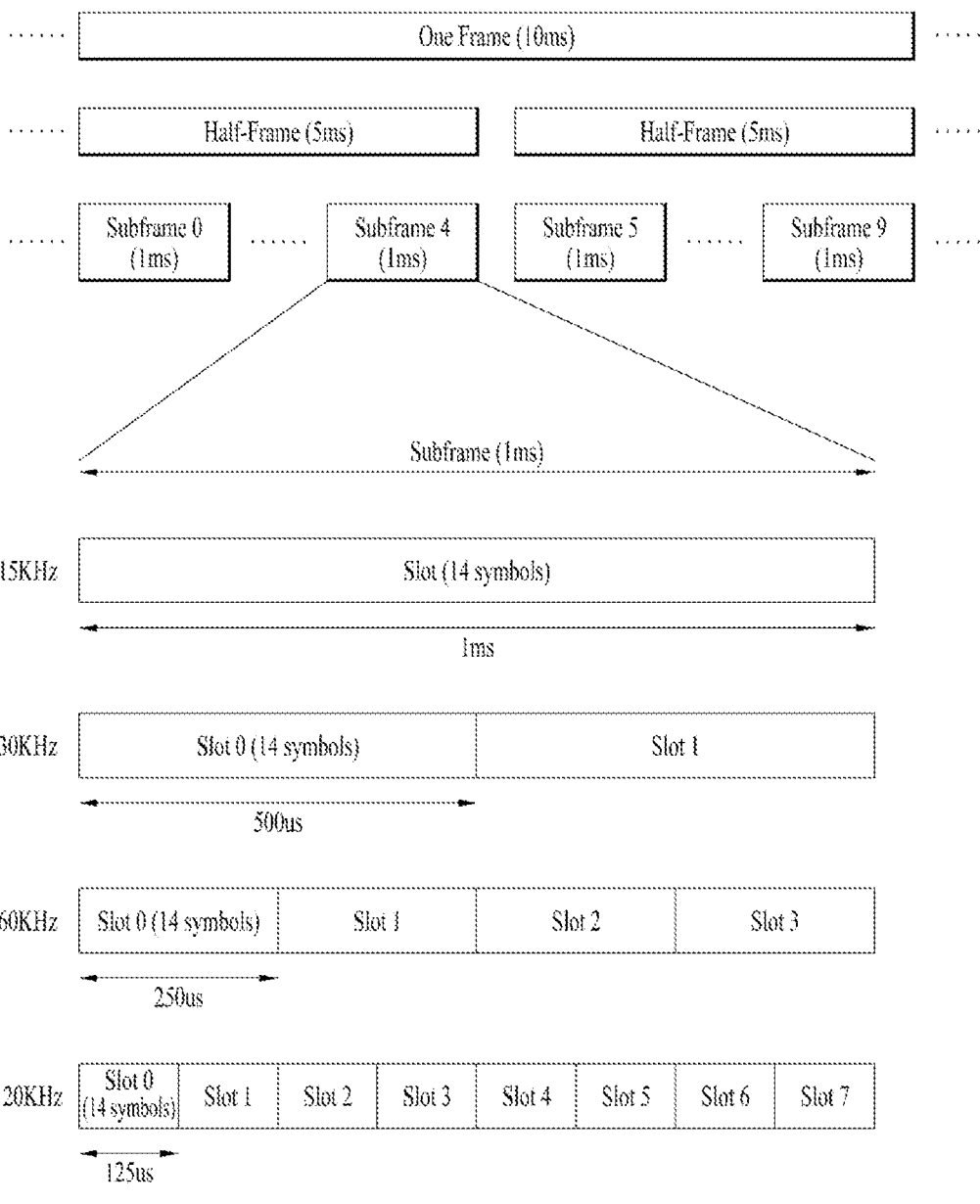
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} * N_f / 100) * T_c = 10$ ms and is divided into two half-frames of 5 ms each. A basic time unit for NR is $T_c = 1/(\Delta f_{max} * N_f)$ where $\Delta f_{max} = 480 * 10^3$ Hz and $N_f = 4096$. For reference, a basic time unit for LTE is $T_s = 1/(\Delta f_{ref} * N_{f,ref})$ where $\Delta f_{ref} = 15 * 10^3$ Hz and $N_{f,ref} = 2048$. $T_c$ and $T_f$ have the relationship of a constant $\kappa = T_s/T_c = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
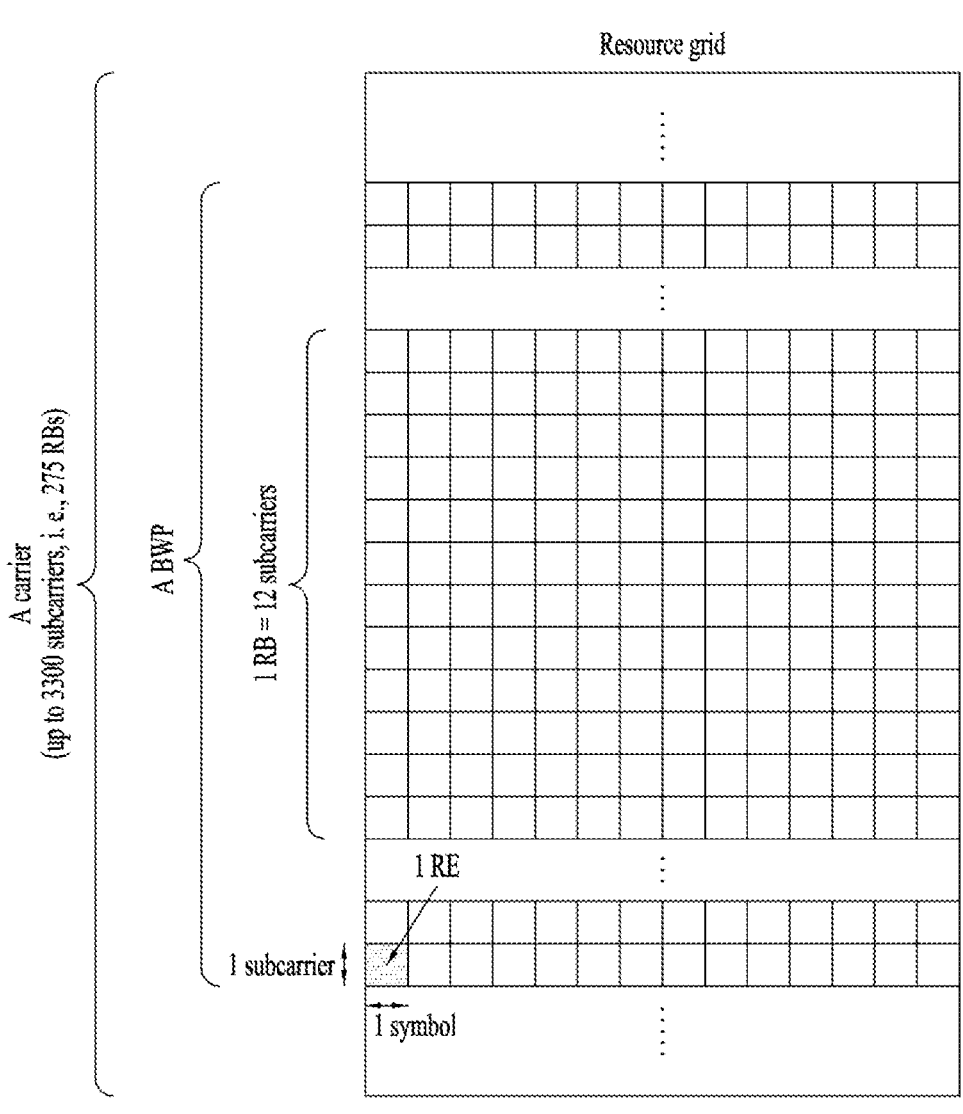
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size, u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB}=n^u_{CRB}+N^{size,u}_{BWP,i}$ where $N^{size,u}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length $L_{RB}$ as a resource indicator value (RIV) on the assumption of $N^{start}_{BWP}=275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 6:
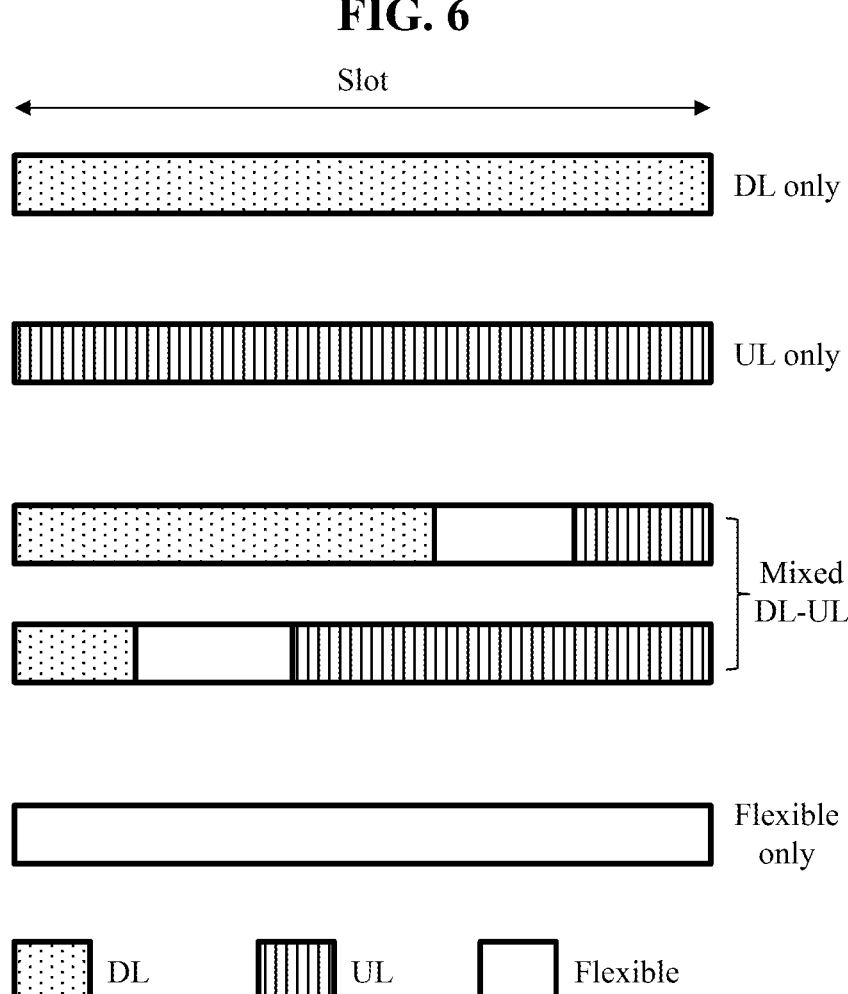
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

dl-UL-TransmissionPeriodicity that provides a periodicity of the DL-UL pattern;

nrofDownlinkSlots that provides the number of consecutive full DL slots at the beginning of each DL-UL pattern, where the full DL slots are slots having only DL symbols;

nrofDownlinkSymbols that provides the number of consecutive DL symbols at the beginning of a slot immediately following the last full DL slot;

nrofUplinkSlots that provides the number of consecutive full UL slots at the end of each DL-UL pattern, where the full UL slots are slots having only UL symbols; and nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| For- | Symbol number in a slot | | | | | | | | | | | | | |
|------|---|---|---|---|---|---|---|---|---|---|----|----|----|----|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |

TABLE 3-continued

| For- | Symbol number in a slot | | | | | | | | | | | | | |
|------|---|---|---|---|---|---|---|---|---|---|----|----|----|----|
| mat | 0 | 1 | 2 | 3 | 4 | 5 | 6 | 7 | 8 | 9 | 10 | 11 | 12 | 13 |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| . . . | | | | | | | . . . | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to a radio network temporary identifier (RNTI) used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 10, DCI format 11, DCI format 1_2, DCI format 00, DCI format 0_1, DCI format 0_2, or DCI format 23).

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH is a physical layer UL channel for uplink control information (UCI) transmission. The PUCCH carries UCI. UCI types transmitted on the PUCCH include hybrid automatic repeat request acknowledgement (HARQ-ACK) information, a scheduling request (SR), and channel state information (CSI). UCI bits include HARQ-ACK information bits if present, SR information bits if present, link recovery request (LRR) information bits if present, and CSI bits if present. In the present disclosure, HARQ-ACK information bits correspond to a HARQ-ACK codebook. In particular, a bit sequence in which HARQ-ACK information bits are arranged according to a predetermined rule is called a HARQ-ACK codebook.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

Link recovery request (LRR)

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH Format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2

PUCCH resource set #1, if 2<the number of UCI bits=<$N_1$

. . .

PUCCH resource set #(K−1), if $N_{K-2}$<the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail. Resource Allocation by PDCCH: Dynamic Grant/Assignment The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
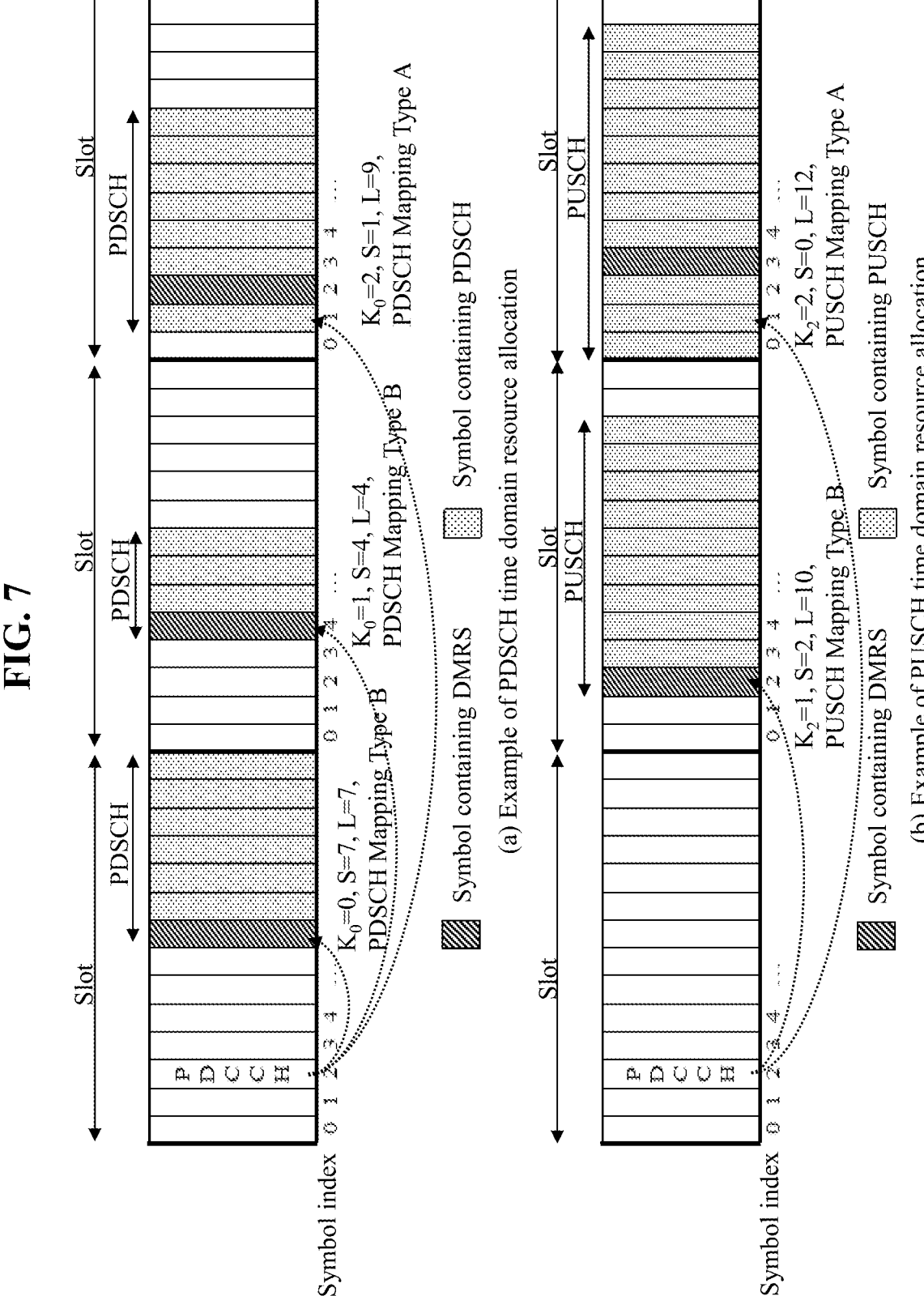
FIG. 7 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;

periodicity corresponding to a periodicity of configured grant Type 1;

timeDomainOffset indicating an offset of a resource with respect to system frame number (SFN)=0 in the time domain;

timeDomainAllocation value m that provides a row index m+1 pointing to the allocation table, indicating a combination of the start symbol S, the length L, and the PUSCH mapping type;

frequencyDomainAllocation that provides frequency domain resource allocation; and mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:

[(SFN*numberOfSlotsPerFrame*numberOfSymbolsPerSlot)+ (slot number in the frame*numberOfSymbolsPerSlot)+symbol number in the slot]= [(SFN$_{stat\ time}$*numberOfSlotsPerFrame* numberOfSymbol-sPerSlot+slot$_{start\ time}$*numberOfSymbolsPerSlot+ symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-RetransmissionTimer is a duration after (re)transmission based on a configured grant in which the UE should not autonomously perform retransmission based on the HARQ process of the (re)transmission. cg-RetransmissionTimer may be provided to the UE by the BS when retransmission on a configured UL grant is configured. For configured grants configured with neither harq-ProcID-Offset nor cg-RetransmissionTimer, the HARQ process ID associated with the first symbol of UL transmission may be derived from the following equation: HARQ Process ID= [floor(CURRENT_symbol/periodicity)] modulo nrof-HARQ-Processes. For configured UL grants with harq-ProcID-Offset2, the HARQ process ID associated with the first symbol of UL transmission may be derived from the following equation: HARQ Process ID=[floor(CURRENT-_symbol/periodicity)] modulo nrofHARQ-Processes+harq-ProcID-Offset2, where CURRENT_symbol= (SFN*numberOfSlotsPerFrame*numberOfSymbolsPerSlot+ slot number in the frame*numberOfSymbolsPerSlot+ symbol number in the slot), and numberOfSlotsPerFrame and numberOfSymbolsPerSlot denote the number of consecutive slots per frame and the number of consecutive OFDM symbols per slot, respectively. For configured UL grants with cg-RetransmissionTimer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling (e.g., SPS configuration) used to configure a semi-persistent transmission:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS;

n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

Multiple DL SPS configurations may be configured within the BWP of a serving cell. After DL assignment is configured for SPS, the UE may consider sequentially that N-th DL assignment occurs in a slot satisfying: (numberOfSlotsPerFrame*SFN+slot number in the frame)= [(numberOfSlotsPerFrame*SFN$_{start\ time}$+slot$_{start\ time}$)+ N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT_slot*10/ (numberOfSlotsPerFrame*periodicity))] modulo nrof-HARQ-Processes, where CURRENT_slot= [(SFN*numberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID= [floor (CURRENT_slot/periodicity)] modulo nrofHARQ-Processes+harq-ProcID-Offset, where CURRENT_slot= [(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 6 and Table 7. Table 6 shows an example of special fields for DL SPS and UL grant Type 2 scheduling activation PDCCH validation, and Table 7 shows an example of special fields for DL SPS and UL grant Type 2 scheduling release PDCCH validation.

TABLE 6

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 7

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

In the present disclosure, a PDSCH based on DL SPS may be referred to as an SPS PDSCH, and a PUSCH based on a UL configured grant (CG) may be referred to as a CG PUSCH. A PDSCH dynamically scheduled by DCI carried on a PDCCH may be referred to as a dynamic grant (DG) PDSCH, and a PUSCH dynamically scheduled by DCI carried by on a PDCCH may be referred to as a DG PUSCH.

Figure 8:
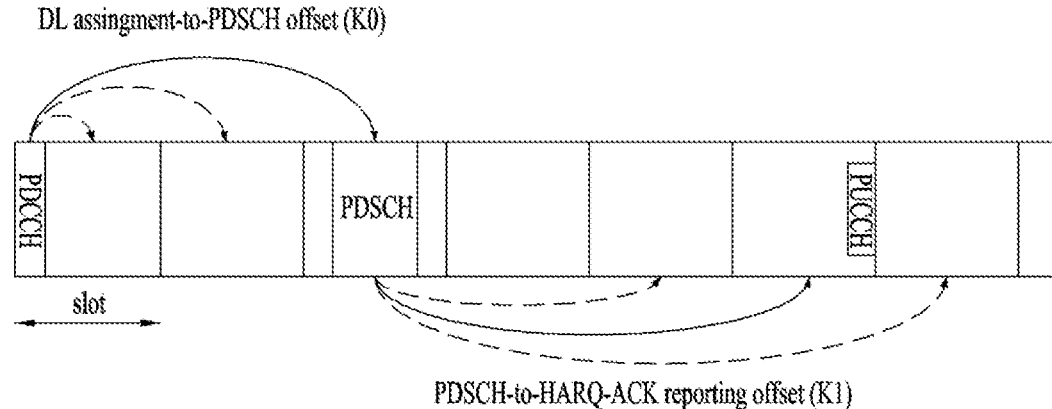
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 11) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as i) a semi-static HARQ-ACK codebook, ii) a dynamic HARQ-ACK codebook and iii) HARQ process based HARQ-ACK codebook, according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, HARQ-ACK information for the PDSCH may be transmitted in slot #(m+k). As an example, $k \in \{1, 2, 3, 4, 5, 6, 7, 8\}$. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when $k \in \{1, 2, 3, 4, 5, 6, 7, 8\}$, the HARQ-ACK information of slot #n may include HARQ-ACK corresponding to slot #(n-8) to slot #(n-1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., $\{1, 2, 3, 4, 5, 6, 7, 8\}$) or may be configured by higher layer (RRC) signaling. The semi-static HARQ-ACK codebook is referred to as a Type-1 HARQ-ACK codebook. For the Type-1 HARQ-ACK codebook, the number of bits to be transmitted in a HARQ-ACK report is fixed and may be potentially large. If many cells are configured but only few cells are scheduled, the Type-1 HARQ-ACK codebook may be inefficient.

In the case of the dynamic HARQ-ACK codebook, the HARQ-ACK payload size that the UE is to report may be dynamically changed by the DCI etc. The dynamic HARQ-ACK codebook is referred to as a Type-2 HARQ-ACK codebook. The Type-2 HARQ-ACK codebook may be considered as optimized HARQ-ACK feedback because the UE sends feedback only for scheduled serving cells. However, in poor channel conditions, the UE may erroneously determine the number of scheduled serving cells. To solve this problem, a downlink assignment index (DAI) may be included as a part of DCI. For example, in the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the case of a HARQ-ACK codebook based on HARQ processes, the HARQ-ACK payload is determined based on all HARQ processes of all configured (or activated) serving cells in a PUCCH group. For example, the size of the HARQ-ACK payload to be reported by the UE using the HARQ-ACK codebook based on HARQ processes may be determined based on the number of all configured or activated serving cells in the PUCCH group configured for the UE and the number of HARQ processes for the serving cells. The HARQ-ACK codebook based on HARQ processes is also referred to as a Type-3 HARQ-ACK codebook. The type-3 HARQ-ACK codebook may be applied to one-shot feedback.

Figure 9:
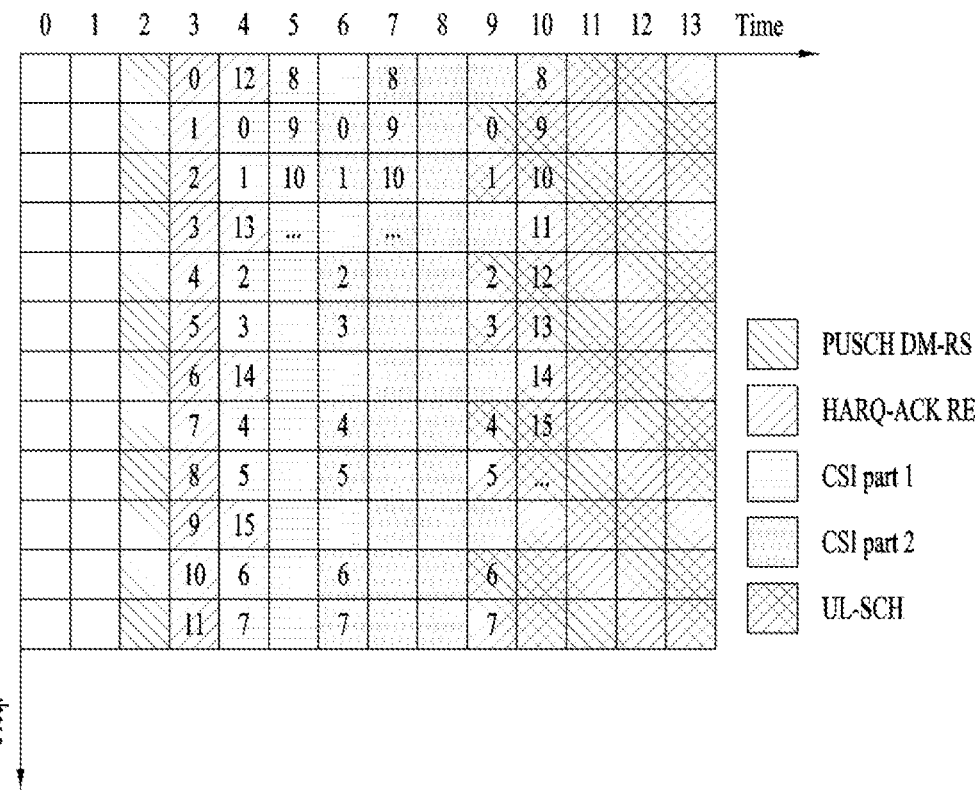
FIG. 9 illustrates an example of multiplexing uplink control information (UCI) with a PUSCH.

FIG. 9 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 9 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 10:
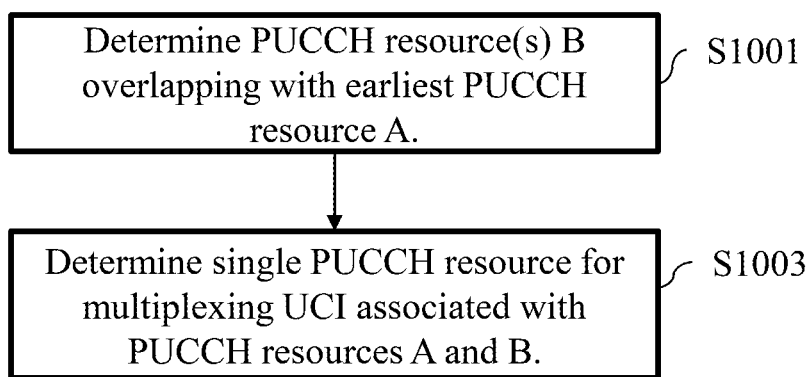
FIG. 10 illustrates an example of a process for a UE with overlapping physical uplink control channels (PUCCHs) in a single slot to handle collision between UL channels.

FIG. 10 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S1001). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S1003). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 11:
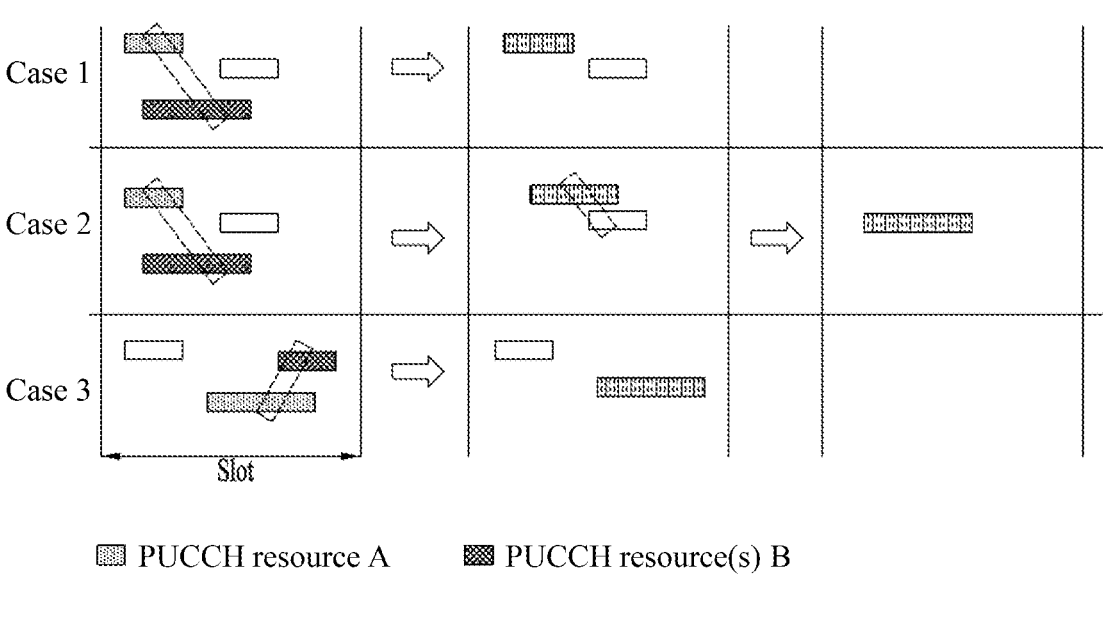
FIG. 11 illustrates cases for performing UCI multiplexing based on FIG. 10.

FIG. 11 illustrates cases for performing UCI multiplexing based on FIG. 10. Referring to FIG. 11, when a plurality of PUCCH resources overlap in a slot, UCI multiplexing may be performed based on the earliest PUCCH resource A (e.g., PUCCH resource A with the earliest start symbol). In FIG. 11, Case 1 and Case 2 show that the first PUCCH resource overlaps with another PUCCH resource. In this case, the process of FIG. 10 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 10 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 10 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 12:
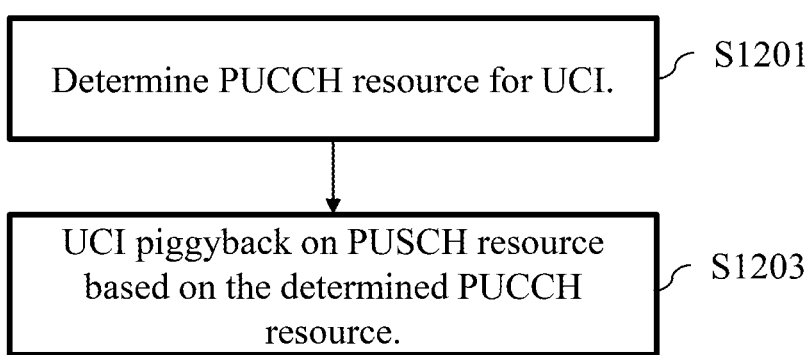
FIG. 12 illustrates a process for a UE with an overlapping PUCCH and PUSCH in a single slot to handle collision between UL channels.

FIG. 12 illustrates a process for a UE with an overlapping PUCCH and PUSCH in a single slot to handle collision between UL channels.

To transmit UCI, the UE may determine a PUCCH resource (S1201). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1203). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted, and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 13:
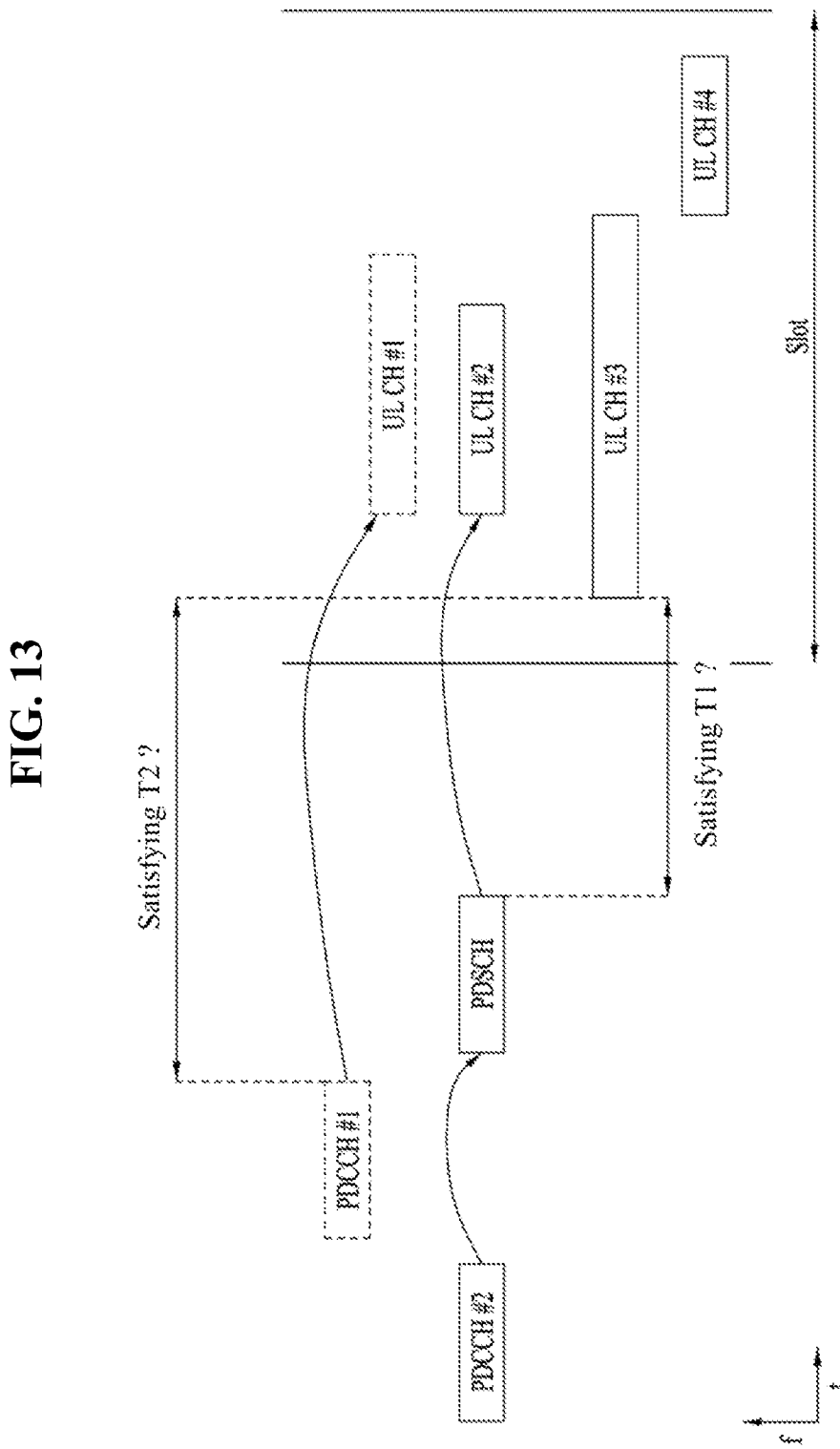
FIG. 13 illustrates UCI multiplexing considering a timeline condition.

FIG. 13 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time T1 from the start symbol of the earliest channel among the overlapping PUCCH(s) and/or PUSCH(s) (on the time axis). T1 may be determined based on i) a minimum PDSCH processing time $N_1$ defined according to a UE processing capability, and/or ii) $d_{1,1}$ predefined as an integer equal to or greater than 0 according to position of scheduled symbol(s), a PUSCH mapping type, BWP switching, etc.

For example, T1 may be determined as follows: $T1=(N_1+d_{1,1})*(2048+144)*\kappa*2^{-u}*T_c$. $N_1$ is based on u of Table 8 and Table 9 for UE processing capabilities #1 and #2, respectively, and u is one of $(u_{PDCCH}, u_{PDSCH}, u_{UL})$, that causes the largest T1, where $u_{PDCCH}$ corresponds to a subcarrier spacing of a PDCCH for scheduling the PDSCH, $u_{PDSCH}$ corresponds to a subcarrier spacing of the scheduled PDSCH, $u_{UL}$ corresponds to a subcarrier spacing of a UL channel on which HARQ-ACK is to be transmitted, and $K=T_c/T_f=64$. In Table 8, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). If the last symbol of the PDSCH for PDSCH mapping type A is present on an i-th slot, $d_{1,1}=7-i$ for i<7 and, otherwise, $d_{1,1}=0$. If the PDSCH has mapping type B for UE processing capability #1, dl may be 0 when the number of allocated PDSCH symbols is 7, $d_{1,1}$ may be 3 when the number of allocated PDSCH symbols is 4, $d_{1,1}$ may be 3+d when the number of allocated PDSCH symbols is 2, where d is the number of overlapping symbols of the scheduling PDCCH and the scheduled PDSCH. If the PDSCH mapping type is B for UE processing capability #2, $d_{1,1}$ may be 0 when the number of allocated PDSCH symbols is 7, and $d_{1,1}$ may correspond to the number of overlapping symbols of the scheduling PDCCH and the scheduled PDSCH when the number of allocated PDSCH symbols is 4. Further, if the number of allocated PDSCH symbols is 2, $d_{1,1}$ may be 3 when the scheduling PDSCH is within a 3-symbol CORESET and the CORESET and the PDSCH have the same starting symbol, and $d_{1,1}$ may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time $N_2$ defined according to a UE PUSCH timing capability, and/or ii) $d_2,x$ predefined as an integer equal to or greater than 0 according to the scheduled symbol position, BWP switching, etc. $d_2,x$ may be categorized into $d_{2,1}$ related to the position of scheduled symbol(s) and $d_{2,2}$ related to BWP switching.

For example, T2 may be determined as follows: $T2=\max\{(N_2+d_{2,1})*(2048+144)*\kappa*2^{-u}*T_c+T_{ext}+T_{switch}, d_{2,2}\}$. N2 is based on u of Table 10 and Table 11 for UE timing capabilities #1 and #2, respectively, and u is one of $(u_{DL}, u_{UL})$, that causes the largest T1, where $u_{DL}$ corresponds to a subcarrier spacing of a PDCCH carrying DCI for scheduling a PUSCH, $u_{UL}$ corresponds to a subcarrier spacing of the PUSCH, and $K=T_c/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 8 shows a PDSCH processing time for PDSCH processing capability #1 of the UE, Table 9 shows a PDSCH processing time for PDSCH processing capability #2 of the UE, Table 10 shows a PUSCH preparation time for PUSCH timing capability #1 of the UE, and Table 11 shows a PUSCH processing time for PUSCH timing capability #2 of the UE.

TABLE 8

| | PDSCH decoding time $N_1$ [symbols] | |
|---|---|---|
| u/SCS | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 9

| u/SCS | PDSCH decoding time $N_1$ [symbols] |
|---|---|
| 0/15 kHz | 3 |
| 1/30 kHz | 4.5 |
| 2/60 kHz | 9 for frequency range 1 |

TABLE 10

| u/SCS | PUSCH preparation time $N_2$ [symbols] |
|---|---|
| 0/15 kHz | 10 |
| 1/30 kHz | 12 |
| 2/60 kHz | 23 |
| 3/120 kHz | 36 |

TABLE 11

| u/SCS | PUSCH preparation time $N_2$ [symbols] |
|-------|----------------------------------------|
| 0/15 kHz | 5 |
| 1/30 kHz | 5.5 |
| 2/60 kHz | 11 for frequency range 1 |

The UE may report a PDSCH processing capability supported thereby with respect to carriers corresponding to one band entry in a band combination to the BS. For example, whether the UE supports only PDSCH processing capability #1 or supports PDSCH processing capability #2 with respect to each subcarrier spacing (SCS) supported in a corresponding band may be reported as a UE capability. The UE may report a PUSCH processing capability supported thereby with respect to carriers corresponding to one band entry in a band combination to the BS. For example, whether the UE supports only PUSCH processing capability #1 or supports PUSCH processing capability #2 with respect to each SCS supported in a corresponding band may be reported as a UE capability.

If the UE configured to multiplex different UCI types within one PUCCH intends to transmit a plurality of overlapping PUCCHs in a slot or transmit overlapping PUCCH (s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 10 to 12 may be UL channels that satisfy the multiplexing timeline condition(s). Referring to FIG. 13, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2, and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

In some scenarios, it is regulated that a UE is not expected to transmit more than one PUCCH having HARQ-ACK information in one slot. Accordingly, according to these scenarios, the UE may transmit at most one PUCCH with the HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed on one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Therefore, for more flexible and efficient resource use and service support, a plurality of (non-overlapping) HARQ-ACK PUCCHs (or PUSCHs) may be allowed to be transmitted in one slot. Thus, in some scenarios, not only PUCCH feedback based on a slot including 14 OFDM symbols but also PUCCH feedback based on a subslot including (e.g., 2 to 7) OFDM symbols smaller than 14 OFDM symbols may be considered.

UL channels may be scheduled or triggered with different priorities. In some implementations of the present disclosure, the priority of a UL channel may be represented by a priority index, and a UL channel of a larger priority index may be determined to have a higher priority than a UL channel of a smaller priority index. In some implementations, the priority of a UL channel may be provided by DCI that schedules or triggers transmission of the UL channel or by an RRC configuration regarding a configured grant for the UL channel. If the priority (or priority index) of a UL channel is not provided to the UE, the priority of the UL channel may be regulated as a low priority (or priority index 0).

For HARQ-ACK feedback for a plurality of DL data channels (e.g., a plurality of PDSCHs) having different service types, QoS, latency requirements, reliability requirements, and/or priorities, separate codebooks may be formed/generated. For example, a HARQ-ACK codebook for PDSCH(s) associated with a high priority and a HARQ-ACK codebook for PDSCH(s) associated with a low priority may be separately configured/formed. For HARQ-ACK feedback for PDSCHs of different priorities, different parameters and resource configurations may be considered for respective PUCCH transmissions for different priorities (e.g., see information element (IE) pucch-ConfigurationList of 3GPP TS 38.331). For example, if the UE is provided with pdsch-HARQ-ACK-CodebookList through RRC signaling, the UE may be instructed to generate one or multiple HARQ-ACK codebooks by pdsch-HARQ-ACK-CodebookList. If the UE is instructed to generate one HARQ-ACK codebook, the HARQ-ACK codebook is associated with a PUCCH of priority index 0. If the UE is provided with pdsch-HARQ-ACK-CodebookList, the UE multiplexes only HARQ-ACK information associated with the same priority index in the same HARQ-ACK codebook. If the UE is instructed to generate two HARQ-ACK codebooks, a first HARQ-ACK codebook is associated with a PUCCH of priority index 0, and a second HARQ-ACK codebook is associated with a PUCCH of priority index 1.

A unit of a time difference (e.g., a PDSCH-to-HARQ-_feedback timing indicator) between a DL data channel and PUCCH transmission for HARQ-ACK feedback transmission may be determined by a pre-configured subslot length (e.g., the number of symbols constituting a subslot). For example, a unit of the time difference from the DL data channel to a PUCCH for HARQ-ACK feedback transmission may be configured by parameter "subslotLengthForPUCCH" in PUCCH-Config, which is configuration information used to configure UE-specific PUCCH parameters.

According to these scenarios, a length unit of the PDSCH-to-HARQ feedback timing indicator may be configured for each HARQ-ACK codebook.

In some scenarios, UL or DL scheduling may be dynamically or semi-statically performed, and the BS may configure or indicate a transmission direction (e.g., DL, UL, or flexible) of each symbol for or to the UE semi-statically using a tdd-UL-DL-ConfigurationCommon or tdd-UL-DL-ConfigurationDedicated message or dynamically using DCI format 2_0. UL or DL scheduling configured by the configured/indicated transmission direction may also be cancelled.

Figure 14:
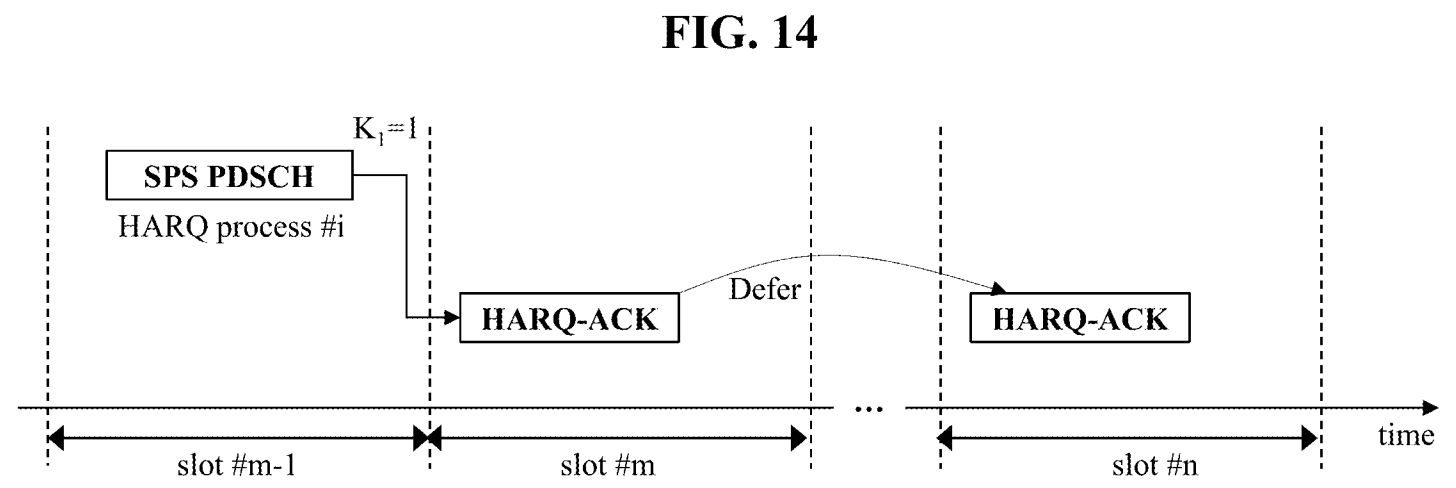

FIG. 14 illustrates exemplary HARQ-ACK deferral.

In some scenarios (e.g., 3GPP NR Rel-16), if the UE receives a PDSCH scheduled by the BS, the UE may transmit a PUCCH carrying a HARQ-ACK for the PDSCH (hereinafter, HARQ-ACK PUCCH) at a time designated by scheduling information for the PDSCH. However, these series of operations always cause the UE to transmit the PUCCH after a lapse of a predetermined time from reception of a semi-persistently configured SPS PDSCH. As a result, a TDD pattern that is not aligned with the period of the SPS PDSCH may be used, or PUCCH transmission may be easily canceled by the dynamic TDD operation of the BS. Further, PDSCH transmission associated with the canceled PUCCH transmission may also be canceled, or retransmission may be requested. To solve these issues, an operation in which the UE defers a PUCCH timing determined for a PDSCH in a prescribed or arbitrary manner, that is, delaying operation is being considered. For example, when a PUCCH configured for carrying a HARQ-ACK for an SPS PDSCH (hereinafter, SPS HARQ-ACK) is canceled by a configured or indicated transmission direction, HARQ-ACK deferral, which delays the HARQ-ACK transmission after the originally expected time, may be considered. Referring to FIG. 14, for example, when an SPS PDSCH in slot #m−1 uses HARQ process #i, and when HARQ-ACK transmission for the SPS PDSCH is scheduled in slot #m, the UE may determine to defer a PUCCH for the HARQ-ACK transmission for the SPS PDSCH from in slot #m to slot #n based on predetermined conditions. According to such HARQ-ACK deferral, even if PUCCH transmission is canceled, the UE and BS may transmit/receive HARQ-ACK information for the SPS PDSCH later.

For a HARQ-ACK response that may not be transmitted due to a TDD-related configuration or indication from the BS (for example, when a HARQ-ACK response for an SPS PDSCH overlaps in time with symbol(s) allocated for DL by an IE TDD-UL-DL-ConfigCommon provided by the BS), if the UE and BS intend to defer transmission and reception of the HARQ-ACK response, but if there are other UL transmissions in a corresponding slot, there may be an issue regarding how to handle the HARQ-ACK response and the other UL transmissions from the perspective of ensuring the HARQ-ACK transmission of the UE. Hereinafter, implementations for determining whether to perform an operation of deferring UCI transmission in consideration of UL multiplexing with other UL transmissions will be described. In addition, implementations for determining PUCCH resources or PUSCH resources for deferred UCI transmission in consideration of multiplexing between UCI and other UL transmissions, which are prescheduled or preconfigured, in a target slot to which the UCI transmission is deferred will be described.

In some scenarios of communication systems where TDD is employed (e.g., LTE-based communication systems), the UE may determine a subframe for transmitting a HARQ- ACK response based on a given TDD configuration and a DL subframe in which a PDSCH is received according to a predefined table. This allows avoiding collisions between the transmission of the HARQ-ACK response and DL subframes. In NR-based wireless communication systems, the BS may perform PDSCH/PUSCH scheduling more flexibly. In addition, even if the UE receives PDSCHs in the same slot, the UE may transmit HARQ-ACK responses for the received PDSCHs in different slots with different PDSCH_to_HARQ-ACK feedback timings. For dynamic scheduling, the BS may prevent collisions between HARQ-ACK response transmission and DL subframes based on such flexibility. However, for SPS PDSCH transmission based on semi-static scheduling and HARQ-ACK response transmission for the SPS PDSCH, a single HARQ-ACK feedback timing indicated during the activation of the SPS PDSCH (e.g., a value determined based on a PDSCH-to-HARQ_feedback timing indicator in DCI activating DL SPS) is continuously used. As a result, it is difficult to flexibly change the HARQ-ACK response time depending on the reception time of the SPS PDSCH. In this situation, collisions may inevitably occur between DL slots/symbols and PUCCH resources for the HARQ-ACK response, which are based on TDD configurations. Although these issues may be partially addressed by deferring the HARQ-ACK transmission, there may be challenges when performing the deferred HARQ-ACK transmission along with other PUCCH transmissions that are previously indicated or configured.

Accordingly, the present disclosure proposes methods for the UE to determine whether a HARQ-ACK PUCCH resource is available and methods for the UE to transmit a corresponding PUCCH in a next available slot if the HARQ-ACK PUCCH resource is not available. In addition, the present disclosure proposes methods of determining whether a HARQ-ACK response is capable of being transmitted in a corresponding slot by considering a HARQ-ACK PUCCH resource and other PUCCH resources that overlap in time with the HARQ-ACK PUCCH resource. Furthermore, the present disclosure proposes methods and procedures for selecting a PUCCH resource for HARQ-ACK transmission in consideration of UL multiplexing with other UL transmissions in another slot when a HARQ-ACK response is not allowed to be transmitted in a specific slot and thus deferred to the other slot.

UE Side

Figure 15:
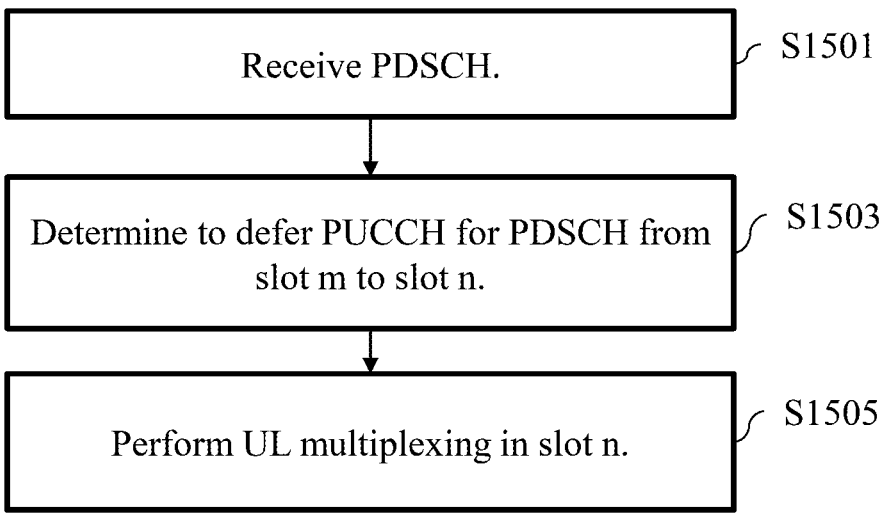
FIG. 15 illustrates an operational flow of a UE according to some implementations of the present disclosure.

FIG. 15 illustrates an operational flow of a UE according to some implementations of the present disclosure.

In some implementations, the UE may be configured with higher layer parameter(s) for determining PUCCH transmissions and slot formats thereof. Then, the UE may be scheduled with a PDSCH in DL scheduling DCI, which is provided from the BS, or configured/activated with an SPS PDSCH through higher layer configurations and DCI. The UE may receive the scheduled PDSCH (S1501) and transmit a PUCCH in response to the scheduled PDSCH. In addition, the UE may defer a specific PUCCH transmission based on indicated or configured PUCCH transmissions (S1503) and multiplex the deferred PUCCH transmission with other PUCCH transmissions (S1505).

Hereinafter, exemplary UE operations according to some implementations of the present disclosure will be described.

1) The UE receives one or more RRC configurations for SPS PDSCH reception and PUCCH transmission from the BS. For each SPS PDSCH configuration, a PUCCH configuration may be received for the corresponding SPS PDSCH configuration. For example, each SPS PDSCH configuration may include information about HARQ resources for a PUCCH for DL SPS. Actual PUCCH resources may be configured by the PUCCH configuration, and a PUCCH resource for the corresponding SPS PDSCH configuration may be referenced by a PUCCH resource identifier (ID). Each SPS PDSCH configuration may include information on the number of HARQ processes configured for DL SPS and an HARQ process ID offset used to derive HARQ process ID(s).

2) The UE may receive an SPS PDSCH activation indication from the BS.

3) The UE may receive an SPS PDSCH based on the SPS PDSCH activation indication and RRC configurations provided by the BS.

4) The UE may transmit a HARQ-ACK PUCCH for the received SPS PDSCH based on the SPS PDSCH activation indication and RRC configurations provided by the BS. According to some implementations of the present disclosure, the UE may determine whether the UE is allowed to transmit the HARQ-ACK response for the received SPS PDSCH by considering other indicated/configured PUCCH resources overlapping in time with the configured HARQ-ACK PUCCH resource, the type and size of UCI to be transmitted, and the transmission direction of a slot/symbol (e.g., slot format). For an example, if the SPS HARQ-ACK PUCCH overlaps with semi-static DL symbols (e.g., a set of symbols indicated as DL by an RRC configuration tdd-UL-DL-ConfigurationCommon or tdd-UL-DLConfigurationDedicated), SSB symbols (e.g., a set of symbols indicated to the UE by SIB1 or ssb-PositionsInBurst in ServingCellConfigCommon for reception of SS/PBCH blocks), and/or ORESET #0 (e.g., a set of symbols of a slot indicated to the UE by pdcch-ConfigSIB1 in a master information block (MIB) for a CORESET for Type0-PDCCH CSS set), the UE may determine that transmitting the HARQ-ACK response for the received SPS PDSCH is not allowed. As another example, if a PUCCH resource selected in consideration of UL multiplexing with other UCI transmissions (e.g., SR, periodic/semi-persistent CSI, etc.) configured through higher layer signaling provided by the BS overlaps with semi-static DL symbols (e.g., a set of symbols indicated as DL by the RRC configuration tdd-UL-DL-ConfigurationCommon or tdd-UL-DL-ConfigurationDedicated), SSB symbols (e.g., a set of symbols indicated to the UE by SIB1 or ssb-PositionsInBurst in ServingCellConfigCommon for reception of SS/PBCH blocks), and/or ORESET #0 (e.g., a set of symbols of a slot indicated to the UE by pdcch-ConfigSIB1 in an MIB for a CORESET for Type0-PDCCH CSS set), the UE may determine that transmitting the HARQ-ACK response for the received SPS PDSCH is not allowed.

5) If transmitting the HARQ-ACK response for the received SPS PDSCH is not allowed, the UE defers a PDSCH-to-HARQ-ACK feedback timing K1 of the corresponding HARQ-ACK response by $K1_{def}$ such that $K1'=K1+K1_{def}$. By doing so, the received PDSCH has a new PDSCH-to-HARQ-ACK feedback timing of K1', where $K1_{def}$ may be an integer greater than 0. In this case, K1' or $K1_{def}$ may be determined by L1 or higher layer signaling from the BS, and/or may have a predefined value.

6) If the PUCCH deferred in step 5) overlaps in time with other PUCCH transmissions, the UE may multiplex the PUCCH transmission with UCI to be transmitted according to some implementations of the present disclosure.

In some implementations of the present disclosure, the following UE operation(s) may be considered.

<Implementation A1> Determination of Availability of PUCCH for HARQ-ACK of SPS PDSCH Reception When the UE is not allowed to transmit a HARQ-ACK response for a received PDSCH, the UE may defer a PDSCH-to-HARQ-ACK feedback timing (hereinafter referred to as a HARQ timing) K1 of the corresponding HARQ-ACK response by $K1_{def}$ such that $K1'=K1+K1_{def}$. By doing so, the received PDSCH has a new PDSCH-to-HARQ-ACK feedback timing of K1', where $K1_{def}$ may be an integer greater than 0. The UE may use at least one of the following methods to determine whether the transmission of the HARQ-ACK response is allowed.

Method A1-1: For a specific PUCCH carrying a HARQ-ACK for SPS PDSCH reception, PUCCH A, the UE determines that transmission of PUCCH A is not allowed if a PUCCH carrying HARQ-ACK feedback for an SPS PDSCH, which is used when it is assumed that there are no other PUCCHs in a given slot, satisfies the following conditions. For example, such a PUCCH may be a PUCCH for SPS HARQ-ACK transmission determined by PUCCH-config in SPS-PUCCH-AN-List, which is configuration information used to configure UE-specific PUCCH parameters, or n1PUCCH-AN in SPS-config, which is configuration information used to configure DL semi-persistent transmission, based on the size of SPS HARQ-ACK bits transmitted in the corresponding slot. In this document, SPS-PUCCH-AN-List refers to an RRC IE used to configure a list of PUCCH resources for each HARQ-ACK codebook, and n1PUCCH-AN refers to a PUCCH resource ID indicating a HARQ resource for a PUSCH for DL SPS. Actual PUCCH resources are configured by PUCCH-Config and referenced by the ID. Details of parameters in PUCCH-config and parameters in SPS-config may be found in 3GPP TS 38.331.

The above conditions may include when PUCCH A overlaps in time with at least one of the following symbols: semi-static DL symbols (e.g., a set of symbols indicated as DL by tdd-UL-DL-ConfigurationCommon or tdd-UL-DLConfigurationDedicated); semi-static flexible symbols (e.g., a set of symbols not indicated as either DL or UL by tdd-UL-DL-ConfigurationCommon or tdd-UL-DLConfigurationDedicated); SSB symbols (e.g., a set of symbols indicated to the UE by SIB1 or ssb-PositionsInBurst in ServingCellConfigCommon for reception of SS/PBCH blocks); and/or ORESET #0 (e.g., an MIB for a CORESET for Type0-PDCCH CSS set). For example, for specific SPS HARQ-ACK transmission, if the number of SPS HARQ-ACK bits to be transmitted without consideration of other PUCCH scheduling is X bits, PUCCH resource A may be selected from SPS-PUCCH-AN-List in the RRC configuration PUCCH-config. If one or more symbols occupied by selected PUCCH resource A are indicated as DL by the RRC configuration tdd-UL-DL-ConfigurationCommon, the UE and BS may determine that the SPS HARQ-ACK transmission is not allowed.

In some implementations of Method A1-1, if a CC (e.g., PUCCH cell) on which PUCCH transmission is to be performed is dynamically indicated or if such a CC changes for every PUCCH transmission according to a predetermined rule, the above conditions may be applied to CCs indicated by the BS for the PUCCH transmission or all CCs on which the PUCCH transmission is allowed. In other words, if the CCs indicated by the BS for the PUCCH transmission (if any) and all CCs on which the PUCCH transmission is allowed satisfy the above conditions, it may be determined that transmission of PUCCH A is not allowed.

Method A1-2: For a specific PUCCH carrying a HARQ-ACK for SPS PDSCH reception, PUCCH A, if a PUCCH used when multiplexing with other UL transmissions in a given slot is assumed satisfies the following conditions, the UE determines that transmission of PUCCH A is not allowed.

The above conditions may include when PUCCH A overlaps in time with at least one of the following symbols: semi-static DL symbols (e.g., a set of symbols indicated as DL by tdd-UL-DL-ConfigurationCommon or tdd-UL-DLConfigurationDedicated); semi-static flexible symbols (e.g., a set of symbols not indicated as either DL or UL by tdd-UL-DL-ConfigurationCommon or tdd-UL-DLConfigurationDedicated); SSB symbols (e.g., a set of symbols indicated to the UE by SIB1 or ssb-PositionslnBurst in ServingCellConfigCommon for reception of SS/PBCH blocks); and/or ORESET #0 (e.g., an MIB for a CORESET for Type0-PDCCH CSS set).

In some implementations of Method A1-2, the "other UL transmissions" may be limited to PUCCH transmission or PUCCH transmission carrying a specific type of UCI. The specific type of UCI may be a HARQ-ACK, a HARQ-ACK and an SR, or a HARQ-ACK and CSI.

Alternatively, in some implementations of Method A1-2, the "other UL transmissions" may be limited to semi-statically configured PUCCH transmission. For example, the "other UL transmissions" may be limited to an SR PUCCH occasion or periodic/quasi-persistent CSI. The reason for this is that considering PUCCH transmission indicated by dynamic scheduling, the UE needs to make a choice regarding the dynamic scheduling up to a specific time point in order to secure the processing time of the UE. Therefore, if the HARQ-ACK deferral operation is performed in consideration of PUCCH transmission indicated by dynamic scheduling, it may increase the complexity of the HARQ-ACK deferral operation and increase the implementation difficulty of the UE.

In some implementations of Method A1-2, when performing HARQ-ACK transmission for a dynamically scheduled PDSCH, the UE may expect that the BS will schedule PDSCHs such that HARQ-ACK transmission is always allowed and then determine that transmission of a HARQ-ACK response for the dynamically scheduled PDSCH in a scheduled slot is feasible. In other words, this method may be employed by assuming that PUCCH transmission indicated by the BS through dynamic scheduling is always enabled in a corresponding slot, thereby reducing the implementation difficulty of the UE.

As an example of Method A1-2, when the UE intends to transmit multiplexed UCI X bits on one or more overlapping PUCCH resources including an SPS HARQ-ACK PUCCH according to the method described in Section 9 of 3GPP TS 38.213, the UE may select PUCCH resource A. When one or more symbols occupied by selected PUCCH resource A are indicated as DL by the RRC configuration tdd-UL-DL-ConfigurationCommon, the UE and BS may determine that the SPS HARQ-ACK transmission is not allowed. When it is determined that the SPS HARQ-ACK transmission is not allowed, the UE may transmit all or some Y bits of the multiplexed UCI X bits on a deferred PUCCH resource. In this case, the Y bits may be SPS HARQ-ACK bit(s) among the X bits.

In some implementations of Method A1-2, if a CC (i.e., PUCCH cell) on which PUCCH transmission is to be performed is dynamically indicated or if such a CC changes for every PUCCH transmission according to a predetermined rule, the above conditions may be applied to CCs indicated by the BS for the PUCCH transmission or all CCs on which the PUCCH transmission is allowed. In other words, if the CCs indicated by the BS for the PUCCH transmission (if any) and all CCs on which the PUCCH transmission is allowed satisfy the above conditions, it may be determined that transmission of PUCCH A is not allowed.

<Implementation A2> Determination of PUCCH Resource for Deferred HARQ-ACK with UL Multiplexing When the UE is not allowed to transmit a HARQ-ACK response for a received PDSCH, the UE may defer a PDSCH-to-HARQ-ACK feedback timing (hereinafter referred to as a HARQ timing) K1 of the corresponding HARQ-ACK response by $K1_{def}$ such that $K1'=K1+K1_{def}$. In other words, the UE may defer the transmission of the corresponding HARQ-ACK response from a slot where the transmission is originally instructed/configured (hereinafter referred to as an original slot) to another slot (hereinafter referred to as a target slot) such that the received PDSCH has a new PDSCH-to-HARQ-ACK feedback timing of K1', where $K1_{def}$ may be an integer greater than 0. The UE may multiplex and transmit UCI including the deferred HARQ-ACK with other UL transmissions in a target slot, which is determined based on the HARQ timing obtained from the HARQ deferral. In this case, a PUCCH resource for transmitting the multiplexed UCI may be selected according to at least one of the following methods. The UE may select a different method depending on UCI to be transmitted in the target slot.

Method A2-1: When the UE defers UCI including a HARQ-ACK to be transmitted in the original slot and transmits the deferred UCI in the target slot, slot n, the UE may select a PUCCH resource according to the following procedures.

Procedure A2-1-1. Without considering the deferred PUCCH, the UE determines a PUCCH resource for transmission in consideration of the number of UCI bits to be transmitted after multiplexing with UL transmissions indicated/configured in slot n, an indicated PUCCH resource set, the type of UCI to be transmitted, etc. In this case, the method of Section 9 of 3GPP TS 38.213 (e.g., Section 9 of 3GPP TS 38.213 Rel-15 or Rel-16) may be used.

Procedure A2-1-2. When one or more PUCCH resources determined by Procedure A2-1-1 overlap in time with a deferred PUCCH resource or when there is a PUCCH carrying a HARQ-ACK among the PUCCH resource(s) determined by Procedure A2-1-1, the UE may transmit UCI bit(s) to be transmitted on the corresponding PUCCH resources together with deferred UCI bit(s). Otherwise, the UE independently transmits the deferred PUCCH resource. If the deferred HARQ-ACK is an SPS HARQ-ACK, the "deferred PUCCH resource" may be a PUCCH resource determined by SPS-PUCCH-AN-List in PUCCH-config or n1PUCCH-AN in SPS-config based on the size of deferred SPS HARQ-ACK bits (i.e., the number of deferred SPS HARQ-ACK bits). Alternatively, the "deferred PUCCH resource" may be a PUCCH resource selected to transmit the UCI including the HARQ-ACK in the original slot, that is, a PUCCH resource selected in consideration of UL multiplexing in the original slot. For example, a PUCCH resource with the same PUCCH resource ID as the one selected considering UL multiplexing in the original slot may be used as the "deferred PUCCH resource." In some implementations, when the deferred PUCCH resource and two or more PUCCH resources determined by Procedure A2-1-1 overlap in time at the same time, the UE may transmit the deferred UCI bit(s) together on a PUCCH resource that starts earlier. The reason for this is to minimize the delay time of the deferred UCI bit(s). In some implementations, the UE may not expect to transmit the deferred UCI bit(s) together on a PUCCH resource carrying UCI with a size less than or equal to two bits. In some implementations, when the UE independently transmits the deferred PUCCH resource, the UE may expect that the total number of PUCCHs to be transmitted in the target slot including the deferred PUCCH resource is two or less. Furthermore, the UE may expect that other PUCCH transmissions in the target slot carry no HARQ-ACKs.

Procedure A2-1-3. If the PUCCH resource determined by Procedure A2-1-1 overlaps in time with PUSCH transmission, the UE may transmit the UCI bit(s) to be transmitted on the corresponding PUCCH resource, which are given by Procedure A2-1-2, on the overlapping PUSCH resource without performing the corresponding PUCCH transmission. To perform this procedure, the method of Section 9 of 3GPP TS 38.213 (e.g., Section 9 of 3GPP TS 38.213 Rel-15 or Rel-16) may be used.

Method A2-2: When the UE defers UCI including a HARQ-ACK to be transmitted in the original slot and transmits the deferred UCI in the target slot, the UE may select a PUCCH resource according to the following procedures.

Procedure A2-2-1. The UE determines a PUCCH resource for transmission in consideration of the size of UCI bit(s) to be transmitted when the deferred UCI transmission (or a PUCCH resource on which the deferred UCI transmission is to be performed) is multiplexed with UL transmissions indicated/configured in slot n, an indicated PUCCH resource set, and the type of UCI to be transmitted. In this case, the method of Section 9 of 3GPP TS 38.213 (e.g., Section 9 of 3GPP TS 38.213 Rel-15 or Rel-16) may be used. If the deferred HARQ-ACK is an SPS HARQ-ACK, the PUCCH resource of the "deferred UCI transmission" to be considered for UL multiplexing may be a PUCCH resource determined by SPS-PUCCH-AN-List in PUCCH-config or n1PUCCH-AN in SPS-config based on the size of deferred SPS HARQ-ACK bits. Alternatively, the PUCCH resource of the "deferred UCI transmission" to be considered for UL multiplexing may be a PUCCH resource selected to transmit the corresponding UCI in the original slot, that is, a PUCCH resource selected in consideration of UL multiplexing in the original slot.

Procedure A2-2-2. If the PUCCH resource determined by Procedure A2-2-2 overlaps in time with PUSCH transmission, the UE may transmit the UCI bit(s) to be transmitted on the corresponding PUCCH resource on the overlapping PUSCH resource without performing the corresponding PUCCH transmission. To perform this procedure, the method of Section 9 of 3GPP TS 38.213 (e.g., Section 9 of 3GPP TS 38.213 Rel-15 or Rel-16) may be used.

Method A2-3: When the UE defers UCI including a HARQ-ACK to be transmitted in the original slot and transmits the deferred UCI in the target slot, the UE may select a PUCCH resource according to the following procedures.

Procedure A2-3-1. As if there is no deferred PUCCH, the UE determines a PUCCH resource for transmission in consideration of the size of UCI bit(s) to be transmitted after multiplexing with UL transmissions indicated/configured in slot n, an indicated PUCCH resource set, and the type of UCI to be transmitted. In this case, the method of Section 9 of 3GPP TS 38.213 (e.g., Section 9 of 3GPP TS 38.213 Rel-15 or Rel-16) may be used.

Procedure A2-3-2. When one or more PUCCH resources determined by Procedure A2-3-1 overlap in time with a deferred SPS HARQ-ACK PUCCH resource or when there is a PUCCH carrying a HARQ-ACK among the PUCCH resources determined by Procedure A2-3-1, the UE transmits deferred UCI bit(s) together on the corresponding resources according to at least one of the following conditions (Method A2-3-1). Alternatively, the UE may transmit UCI bit(s) of the UL transmissions indicated/configured in slot n together with the deferred UCI bit(s) on a PUCCH resource to be used when the deferred UCI transmission is multiplexed with the UL transmissions indicated/configured in slot n (Method A2-3-2). In some implementations, the UE may select Method A2-3-1 if PUCCH resource A carries UCI with a size greater than two bits. In some implementations, the UE may select Method A2-3-2 if PUCCH resource A carries UCI with a size less than or equal to two bits. In some implementations, if PUCCH resource A is a PUCCH resource determined by SPS-PUCCH-AN-List in PUCCH-config or n1PUCCH-AN in SPS-config, that is, a PUCCH resources carrying only an SPS HARQ-ACK, the UE may select Method A2-3-2. When Method A2-3-2 is used, if the deferred HARQ-ACK is an SPS HARQ-ACK, the PUCCH resource of the "deferred UCI transmission" to be considered for UL multiplexing may be a PUCCH resource determined by SPS-PUCCH-AN-List in PUCCH-config or n1PUCCH-AN in SPS-config based on the size of deferred SPS HARQ-ACK bits. When Method A2-3-2 is used, the PUCCH resource of the "deferred UCI transmission" to be considered for UL multiplexing may a PUCCH resource selected to transmit the corresponding UCI in the original slot, that is, a PUCCH resource selected in consideration of UL multiplexing in the original slot. When the deferred SPS HARQ-ACK PUCCH resource and two or more PUCCH resources determined by Procedure A2-3-1 overlap in time at the same time, the UE may transmit the deferred UCI bit(s) together on a PUCCH resource that starts earlier. The reason for this is to minimize the delay time of the deferred UCI bit(s).

Procedure A2-3-3. If the PUCCH resource determined by Procedure A2-3-1 overlaps in time with PUSCH transmission, the UE may transmit the UCI bit(s) to be transmitted on the corresponding PUCCH resource, which are given by Procedure A2-3-2, on the overlapping PUSCH resource without performing the corresponding PUCCH transmission. To perform this procedure, the method of Section 9 of 3GPP TS 38.213 (e.g., Section 9 of 3GPP TS 38.213 Rel-15 or Rel-16) may be used.

When Implementation A2 is applied, the UE may determine the earliest slot or subslot including available resources as the target slot, instead of selecting resources in the determined target slot. That is, the UE may determine the target slot for deferred transmission based on the presence of resources capable of transmitting the deferred HARQ-ACK.

<Implementation A3> Special Handling with Maximum Payload Size of PUCCH Resource Set When the UE is not allowed to transmit a HARQ-ACK response for a received PDSCH, the UE may defer a PDSCH-to-HARQ-ACK feedback timing (hereinafter referred to as a HARQ timing) K1 of the corresponding HARQ-ACK response by $K1_{def}$ such that $K1'=K1+K1_{def}$. In other words, the UE may defer the transmission of the corresponding HARQ-ACK response from a slot where the transmission is originally instructed/configured (hereinafter referred to as an original slot) to another slot (hereinafter referred to as a target slot) such that the received PDSCH has a new PDSCH-to-HARQ-ACK feedback timing of K1', where $K1_{def}$ may be an integer greater than 0. The UE may multiplex and transmit UCI including the deferred HARQ-ACK with other UL transmissions in a target slot determined based on the HARQ timing obtained from the HARQ deferral.

The UE and BS may determine a PUCCH resource on which deferred UCI transmission is multiplexed and transmitted together with UCI of another UL transmission according to Implementation A2/B2 or any method similar thereto. When the PUCCH resource is determined without consideration of deferred UCI as in Method A2-1/B2-1 of Implementation A2/B2, the maximum UCI bit size (e.g., maximum payload size maxPayloadSize) configured for the determined PUCCH resource or a PUCCH resource set including the determined PUCCH resource may become smaller than the number of actually transmitted UCI bit(s) including the deferred UCI. In this case, the following methods may be considered.

Method A3-1: The entirety of the deferred UCI may not be transmitted. In this case, if the UE determines the PUCCH resource in consideration of the deferred UCI (e.g., if the UE selects the PUCCH resource set in consideration of the deferred UCI), the UE may determine the PUCCH resource again by excluding the deferred UCI.

Method A3-2: Some portions of the deferred UCI may not be transmitted. In this case, the following methods may be considered.

Method A3-2-1: CSI included in the deferred UCI may be excluded (if any) until the UCI bits to be transmitted including the deferred UCI become smaller than the maximum UCI bit size.

Method A3-2-2: SR(s) included in the deferred UCI may be excluded (if any) until the UCI bits to be transmitted including the deferred UCI become smaller than the maximum UCI bit size.

Method A3-2-3: HARQ-ACK(s) included in the deferred UCI may be excluded (if any) until the UCI bits to be transmitted including the deferred UCI become smaller than the maximum UCI bit size. In this case, each HARQ-ACK bit may be sequentially excluded depending on the reception timing of a PDSCH associated with the corresponding HARQ-ACK bit. To ensure the maximum latency of services supported by a PDSCH, a HARQ-ACK associated with the most recently received PDSCH may be excluded first. Alternatively, a HARQ-ACK associated with the earliest received PDSCH may be excluded first to receive a PDSCH with the shortest latency. Excluding the HARQ-ACK associated with the earliest received PDSCH from transmission enables dropping HARQ-ACK transmission for PDSCH reception exceeding the maximum latency and reducing the latency of meaningful transmission.

Method A3-2: Bit bundling may be performed at regular intervals (e.g., every two bits) to transmit a HARQ-ACK in the deferred UCI or a HARQ-ACK in UCI to be transmitted along with the deferred UCI.

Method A3-3: The UE may not perform transmission on the corresponding PUCCH resource. Alternatively, the UE may not expect that the UCI bits to be transmitted including the deferred UCI exceed the maximum UCI bit size (e.g., maxPayloadSize) configured for the PUCCH resource set.

<Implementation A4> Handling with/without Inter-UE Multiplexing Between Different Priorities When the UE is not allowed to transmit a HARQ-ACK response for a received PDSCH, the UE may defer a PDSCH-to-HARQ-ACK feedback timing (hereinafter referred to as a HARQ timing) K1 of the corresponding HARQ-ACK response by $K1_{def}$ such that $K1'=K1+K1_{def}$. In other words, the UE may defer the transmission of the corresponding HARQ-ACK response from a slot where the transmission is originally instructed/configured (hereinafter referred to as an original slot) to another slot (hereinafter referred to as a target slot) such that the received PDSCH has a new PDSCH-to-HARQ-ACK feedback timing of K1', where $K1_{def}$ may be an integer greater than 0.

The UE may multiplex and transmit UCI including the deferred HARQ-ACK with another UL transmission in a target slot determined based on the HARQ timing obtained from the HARQ deferral. As another example, if the transmission of the UCI including the deferred HARQ-ACK is allowed in a specific slot or if the transmission of the deferred HARQ-ACK is allowed in a specific slot even though the transmission of the UCI including the deferred HARQ-ACK is multiplexed with another UL transmission in the specific slot, the UE may determine the earliest slot among those slots as the target slot and then multiplex and transmit the UCI including the deferred HARQ-ACK with another UL transmission in the determined target slot.

When the UE supports UL multiplexing between different priorities (i.e., inter-priority intra-UE multiplexing) and thus is capable of transmitting UCIs and/or UL-SCHs, which are scheduled by different HARQ-ACK codebook priorities or different priority indicators, on a single PUCCH and/or PUSCH resource, and when the UE is allowed to perform the HARQ-ACK deferral operation, the UE and BS may first consider the following.

1) Case 1: When transmission of a PUCCH on which high (or higher) priority (HP) UCI and low (or lower) priority (LP) UCI are multiplexed is not allowed, if one of the UCIs includes HARQ-ACK bit(s) for which the HARQ-ACK deferral operation is configured, Method A4a-1: The UE may perform the deferral operation regardless of the priorities of the HARQ-ACK bit(s) for which the deferral operation is configured.

Method A4a-2: The UE may perform the deferral operation only for HP HARQ-ACK bit(s) among the HARQ-ACK bit(s) for which the deferral operation is configured.

Method A4a-3: The UE may perform the deferral operation only for LP HARQ-ACK bit(s) among the HARQ-ACK bit(s) for which the deferral operation is configured.

Method A4a-4: The UE may perform the deferral operation only for HARQ-ACK bit(s) with the same priority as the PUCCH (e.g., HP PUCCH) on which the HP UCI and LP UCI are multiplexed among the HARQ-ACK bit(s) for which the deferral operation is configured.

Method A4a-5: Before inter-priority intra-UE multiplexing, the UE may determine whether to perform the deferral operation based on a PUCCH where UL multiplexing is performed for each priority. For example, at least one of the following methods may be considered.

Method A4a-5-1: Before the inter-priority intra-UE multiplexing, if the UE determines that transmission of a PUCCH carrying the HARQ-ACK bit(s) for which the deferral operation is configured is not allowed for the following reasons: the PUCCH is a PUCCH resource configured by a parameter n1PUCCH or a parameter SPS-PUCCH-AN-List-r16; and the PUCCH overlaps in time with semi-static DL symbols, SSBs, and CORESET #0, the UE may perform the deferral operation for the corresponding HARQ-ACK bit(s).

Method A4a-6: The UE may perform the deferral operation only when at least one HARQ-ACK bit(s) for which the deferral operation is configured is included in each of the HP UCI and LP UCI.

Method A4a-7: The UE does not perform the deferral operation.

In some implementations, these methods (e.g., Method A4a-1 to Method A4a-7) may be limited to cases where a PUCCH on which HP and LP HARQ-ACKs are multiplexed is derived from a PUCCH resource for SPS HARQ-ACK transmission, for example, a PUCCH resource or a PUCCH resource set configured by the parameter n1PUCCH or the parameter SPS-PUCCH-AN-List-r16.

In some implementations, these operations (e.g., Method A4a-1 to Method A4a-7) may be limited to cases where a PUCCH on which HP and LP HARQ-ACKs are multiplexed is a HP PUCCH. In other words, the corresponding PUCCH may be a PUCCH resource set as HP or a resource used for a HARQ-ACK codebook indicated as HP.

In some implementations, when Method A4a-5 is applied, Method A4a-5 may be combined with Method A4a-1/A4a-2/A4a-3/A4a-4. For example, when Method A4a-2 and Method A4a-5 are combined, the UE may determine whether to perform the deferral operation for HP HARQ-ACK bit(s) according to Method A4a-5 and may not perform the deferral operation for LP HARQ-ACK bit(s). As another example, when Method A4a-4 and Method A4a-5 are combined, the UE may determine whether to perform the deferral operation for HARQ-ACK bit(s) of the same priority as a PUCCH (e.g., HP PUCCH) on which HP UCI and LP UCI are multiplexed according to Method A4a-5 and may not perform the deferral operation for HARQ-ACK bit(s) of different priorities.

2) Case 2: When transmission of a PUSCH on which HP and LP HARQ-ACKs are multiplexed is not allowed, Method A4b-1: The UE does not perform the deferral operation.

Method A4b-2: Before inter-priority intra-UE multiplexing, the UE may determine whether to perform the deferral operation based on a PUCCH where UL multiplexing is performed for each priority. For example, at least one of the following methods may be considered.

Method A4b-2-1: Before the inter-priority intra-UE multiplexing, if the UE determines that transmission of a PUCCH carrying HARQ-ACK bit(s) for which the deferral operation is configured is not allowed for the following reasons: the PUCCH is a PUCCH resource configured by the parameter n1PUCCH or the parameter SPS-PUCCH-AN-List-r16; and the PUCCH overlaps in time with semi-static DL symbols, SSBs, and CORESET #0, the UE may perform the deferral operation for the corresponding HARQ-ACK bit(s).

These operation(s) may be limited to cases where the PUSCH on which the HP and LP HARQ-ACKs are multiplexed is a HP PUSCH. In other words, the corresponding PUSCH may be a PUSCH resource set as HP or a PUSCH resource indicated as HP.

3) Case 3: When a HP PUCCH or HP PUSCH is prioritized and transmitted but a LP PUCCH or LP PUSCH and LP UCI are not prioritized and thus not transmitted after a process for multiplexing the HP PUCCH or HP PUCCH and the LP PUCCH or LP PUSCH, if the LP UCI includes HARQ-ACK bit(s) for which the HARQ-ACK deferral operation is configured, Method A4c-1: The UE does not perform the deferral operation (for the LP UCI and LP PUCCH/PUSCH that are not transmitted).

Method A4c-2: Before inter-priority intra-UE multiplexing, the UE may determine whether to perform the deferral operation based on a PUCCH where UL multiplexing is performed for each priority. For example, at least one of the following methods may be considered.

Method A4c-2-1: Before the inter-priority intra-UE multiplexing, if the UE determines that transmission of a PUCCH carrying HARQ-ACK bit(s) for which the deferral operation is configured is not allowed for the following reasons: the PUCCH is a PUCCH resource configured by the parameter n1PUCCH or the parameter SPS-PUCCH-AN-List-r16; and the PUCCH overlaps in time with semi-static DL symbols, SSBs, and CORESET #0, the UE may perform the deferral operation for the corresponding HARQ-ACK bit(s).

If PUCCH transmission scheduled (or expected) in the original slot is subject to the HARQ-ACK deferral operation according to predetermined conditions, the UE performs the deferred HARQ-ACK transmission in the earliest target slot and/or on the earliest target resource.

When the HARQ-ACK deferral operation is performed on a LP HARQ-ACK and/or a HP HARQ-ACK, there may be an issue regarding how to determine the earliest target slot/resource for the deferred LP HARQ-ACK and/or deferred HP HARQ-ACK.

Figure 16:
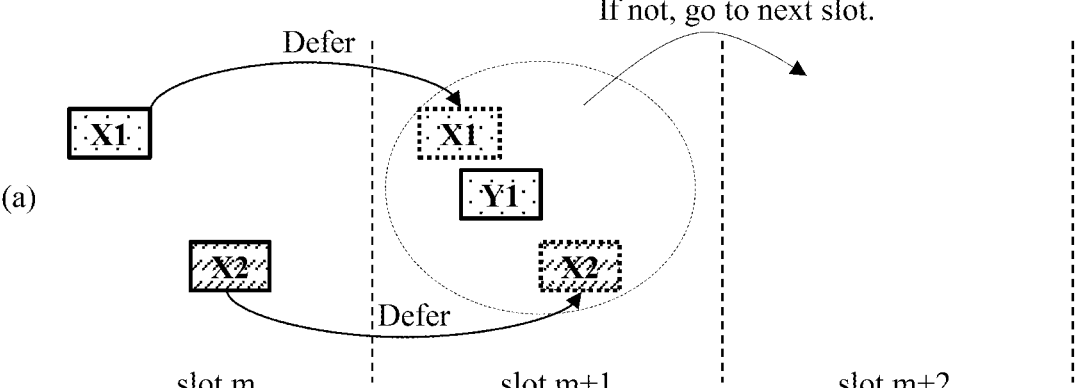
FIG. 16 illustrates HARQ-ACK deferral for a high (or higher) priority HARQ-ACK and a low (or lower) priority HARQ-ACK according to some implementations of the present disclosure.
Figure 16:
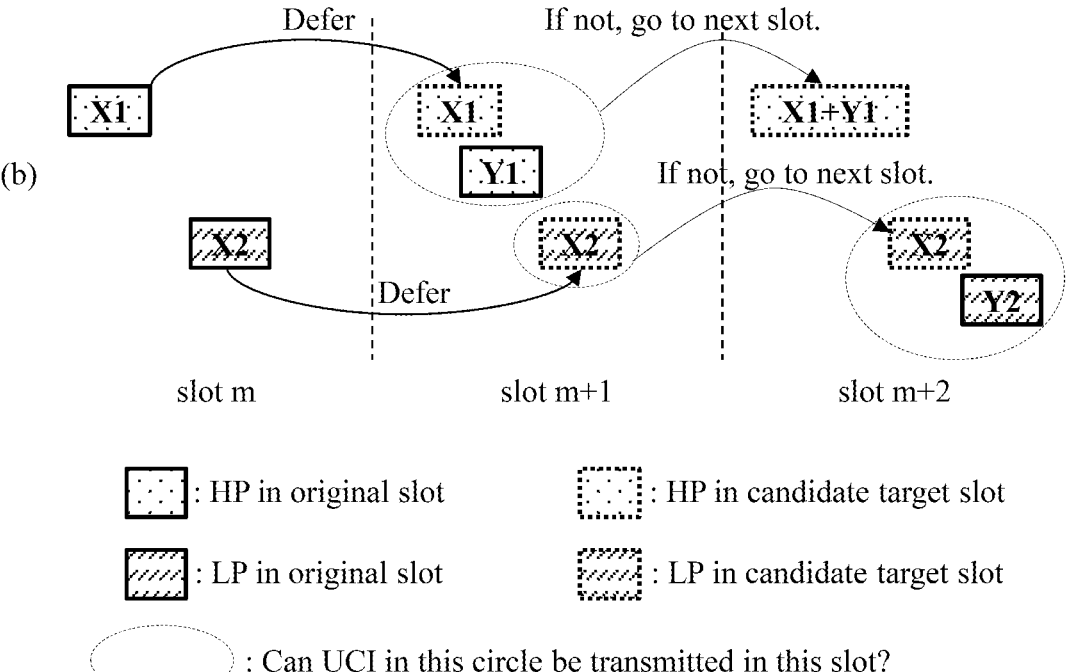

FIG. 16 illustrates HARQ-ACK deferral for HP and LP HARQ-ACKs according to some implementations of the present disclosure. FIG. 16 shows an example in which a slot in which transmission of HP HARQ-ACK X1 is scheduled (i.e., the original slot of HP HARQ-ACK X1) and a slot in which transmission of LP HARQ-ACK X2 is scheduled (i.e., the original slot of LP HARQ-ACK X2) are the same, that is, both are slot m. However, implementations of the present disclosure may be applied even when the original slot for transmission of HP HARQ-ACK X1 and the original slot for transmission of LP HARQ-ACK X2 are different.

In some implementations of the present disclosure, when a LP HARQ-ACK and/or a HP HARQ-ACK are subject to the deferral operation, the UE may consider the following methods to determine the target slot/resource for the HARQ-ACK deferral operation.

Method A4-1: The UE may defer HARQ-ACK transmission to a slot or subslot including a PUSCH and/or PUCCH for carrying both a deferred LP HARQ-ACK and/or a deferred HP HARQ-ACK.

Referring to FIG. 16(*a*), when HP HARQ-ACK X1 and LP HARQ-ACK X2 in the original slot, slot m are subject to the HARQ-ACK deferral according to predetermined or predefined conditions, if a PUSCH and/or PUCCH for carrying all of deferred X1 and X2 and HP HAR-ACK Y1, which is scheduled to be transmitted in slot m+1, are present in slot m+1, where slot m+1 is next to slot m, the UE may determine slot m+1 as the target slot. Otherwise, the UE may determine whether deferred X1 and X2 and Y1 are capable of being transmitted all together in slot m+2. If there is another HARQ-ACK scheduled to be transmitted in slot m+2, the other HARQ-ACK may also be considered along with X1, X2 and Y1 in determining whether slot m+2 is used as the target slot.

In Method A4-1, PUSCH and/or PUCCH resources determined by the inter-priority intra-UE multiplexing process may be used to determine a PUSCH and/or PUCCH resource for transmitting both LP and/or HP HARQ-ACKs. For example, even when the UE uses a PUCCH resource set for HP UCI scheduled to the UE in slot n to multiplex the scheduled HP UCI with a deferred HARQ-ACK, if the UE is allowed to use a UL resource for transmission, the UE may defer transmission of the HARQ-ACK to slot n. As another example, if an available LP/HP PUSCH resource scheduled to the UE in slot n overlaps with a PUCCH resource for a deferred HARQ-ACK or a PUCCH resource multiplexed with the deferred HARQ-ACK, the UE may defer transmission of the HARQ-ACK to slot n.

When HARQ-ACK transmission overlaps with DL symbols in a slot and as a result, the HARQ-ACK transmission is not allowed in the slot, the HARQ-ACK deferral may be performed to provide the HARQ-ACK to the BS in another slot. According to Method A4-1, since the UE and BS determine, as the target slot, a slot including a PUSCH or PUCCH resource capable of transmitting both LP and HP HARQ-ACKs, there is an advantage that the LP HARQ-ACK is highly likely to be provided to the BS without being dropped.

Method A4-2: The UE performs the HARQ-ACK deferral operation for a LP HARQ-ACK to be deferred and/or a HP HARQ-ACK to be deferred for each priority. In other words, considering the priorities of deferred HARQ-ACKs, the UE may defer transmission of HARQ-ACKs with the same priority to a slot or subslot including a PUSCH and/or PUCCH for carrying all the HARQ-ACKs with the corresponding priority. According to Method A4-2, the LP HARQ-ACK and HP HARQ-ACK may be deferred to different slots.

For example, when HP HARQ-ACK X1 and LP HARQ-ACK X2 in the original slot, slot m are subject to the HARQ-ACK deferral according to predetermined or predefined conditions, the UE may determine the target slot/target resource for each priority. Referring to FIG. 16(*b*), for HP, if a PUSCH and/or PUCCH for carrying both X1, which is the subject of the HARQ-ACK deferral, and HP HARQ-ACK Y1, which is scheduled to be transmitted in slot m+1, are present in slot m+1, where slot m+1 is next to slot m, the UE may determine slot m+1 as the target slot for transmission of X1 and Y2. Otherwise, the UE may determine whether deferred X1 and Y1 are capable of being transmitted together in the next slot, slot m+2. If there is another HP HARQ-ACK scheduled to be transmitted in slot m+2, the other UCI may also be considered together with X1 and Y1 in determining whether the slot m+2 is used as the target slot for transmission of the HP HARQ-ACKs. Referring to FIG. 16(*b*), for LP, if a PUSCH and/or PUCCH for carrying X2, which is the subject of the HARQ-ACK deferral, are present in slot m+1, where slot m+1 is next to slot m, the UE may determine slot m+1 as the target slot for transmission of X2. Otherwise, the UE may determine whether deferred X2 is capable of being transmitted in the next slot, slot m+2. If there is another LP HARQ-ACK, LP HARQ-ACK Y2 scheduled to be transmitted in slot m+2, the other UCI, UCI Y2 may also be considered together with X2 in determining whether the slot m+2 is used as the target slot for transmission of the LP HARQ-ACKs.

Method A4-2-1: In some implementations, the UE may not consider the inter-priority intra-UE multiplexing in determining a PUSCH and/or PUCCH for carrying all HARQ-ACKs of the same priority. For example, when the UE performs UL multiplexing in a slot for each priority before performing the inter-priority intra-UE multiplexing, if a derived PUCCH or PUSCH does not overlap in time with semi-static DL symbols, SSBs, and CORESET #0, the UE may defer HARQ-ACK transmission to the corresponding slot.

In some implementations of Method A4-2-1, when a PUCCH or PUSCH derived for a deferred HP HARQ-ACK and a PUCCH or PUSCH derived for a deferred LP HARQ-ACK overlap in time with each other within the same slot, if the UE is not configured to perform UCI multiplexing for different priorities, the UE may transmit the deferred HP HARQ-ACK over the PUCCH or PUSCH derived for the deferred HP HARQ-ACK and drop transmission of the deferred LP HARQ-ACK. In some other implementations of Method A4-2-1, when a PUCCH or PUSCH derived for a deferred HP HARQ-ACK and a PUCCH or PUSCH derived for a deferred LP HARQ-ACK overlap in time with each other within the same slot, if the UE is configured to perform UCI multiplexing for different priorities, the UE may determine a PUCCH or PUSCH for multiplexing the deferred HP HARQ-ACK and deferred LP HARQ-ACK in the slot and then transmit the deferred HP HARQ-ACK and deferred LP HARQ-ACK over the determined PUCCH or PUSCH. In some implementations, if the determined PUCCH or PUSCH overlaps in time with semi-static DL symbols, SSBs, and CORESET #0 in the slot, the UE may drop or skip transmitting the deferred HP HARQ-ACK and deferred LP HARQ-ACK.

Method A4-2-2: In some implementations, the UE may consider the inter-priority intra-UE multiplexing in determining a PUSCH and/or PUCCH for carrying all HARQ-ACKs of the same priority. For example, when the UE performs UL multiplexing in a slot for each priority before performing the inter-priority intra-UE multiplexing, if a derived (LP) PUCCH or (LP) PUSCH does not overlap in time with semi-static DL symbols, SSBs, and CORESET #0, and if the derived (LP) PUCCH or (LP) PUSCH does not overlap in time with another HP PUSCH and/or PUCCH, the UE may defer HARQ-ACK transmission to the corresponding slot. Additionally, when the derived (LP) PUCCH or (LP) PUSCH overlaps in time with the other HP PUSCH and/or PUCCH, if a HP PUCCH and/or PUCCH determined to be transmitted after UL multiplexing with the corresponding HP PUCCH and/or PUSCH do not overlap with the semi-static DL symbols, SSBs, and CORESET #0, the UE may defer the HARQ-ACK transmission to the corresponding slot. In some implementations, if the HP PUCCH and/or PUSCH determined to be transmitted after the UL multiplexing with the corresponding HP PUCCH and/or PUSCH overlap with the semi-static DL symbols, SSBs, and CORESET #0 due to the overlap in time between the derived PUCCH or PUSCH and the other HP PUSCH and/or PUCCH, the UE may determine whether to defer the HARQ-ACK transmission to a next slot.

When Method A4-2 is applied, if HARQ-ACK(s) are dropped without being transmitted due to the overlap in time with the other HP PUSCH and/or PUCCH and the UL multiplexing (i.e., inter-priority intra-UE multiplexing) with the corresponding HP PUCCH and/or PUSCH (for example, when a one-bit HP HARQ-ACK using PUCCH format 0 overlaps in time with a LP HARQ-ACK or when a HP SR overlaps in time with a LP HARQ-ACK using PUCCH format 2, 3 or 4), the UE may determine that the corresponding slot is not suitable as the target slot/resource (that is the corresponding slot is invalid or non-available) and restart the HARQ-ACK deferral operation in another slot. Alternatively, the UE may stop the deferral operation for the HARQ-ACK(s), which are not transmitted, and may not transmit the corresponding HARQ-ACK(s).

According to Method A4-1, the (earliest) slot including a PUCCH or PUSCH for carrying both LP and HP HARQ-ACKs is determined as the target slot, and thus, the process for the UE and BS to determine the target slot may be complicated. The target slot determined according to Method A4-1 is more likely to be farther from the original slot, compared to the target slot determined according to Method A4-2. A significant time difference between the original and target slots implies an increase in delay. Therefore, transmission of a deferred HARQ-ACK based on Method A4-1 may be delayed compared to transmission of a deferred HARQ-ACK based on Method A4-2. Considering that the BS may schedule a specific transmission with a (higher) priority to allow the transmission to be executed more promptly, delay in transmission of a HP HARQ-ACK may not be desirable. According to Method A4-2, there are advantages in simplifying the process of determining the target slot for a deferred HARQ-ACK and preventing excessive delay by selecting a slot relatively close to the original slot as the target slot. In addition, if the priorities (of HARQ-ACK transmissions) and the permissibility of the HARQ-ACK deferral are provided for each SPS configuration, the UE and BS only need to determine the target slot based on HARQ-ACK information for PDSCHs based on SPS configuration(s) with the same priority and having configured the HARQ-ACK deferral (hereinafter such HARQ-ACK information is referred to as SPS HARQ-ACK information). Accordingly, the sizes of HARQ-ACK transmissions and HARQ-ACK payloads considered in determining the target slot may be reduced. This may further simplify the process of determining the target slot for a deferred HARQ-ACK and increase the likelihood of determining an earlier slot as the target slot. Furthermore, in some scenarios, the overlap between transmissions with the same priority is resolved first before addressing the overlap between transmissions with different priority. For the scenarios where the overlap between UL transmissions is resolved, Method A4-2 that determines the target slot for each priority may be considered more suitable for consistent system implementation, compared to Method A4-1.

In some implementations of the present disclosure, if the deferred HARQ-ACK is an SPS HARQ-ACK, the PUCCH resource of "deferred LP and/or HP HARQ-ACKs" to be transmitted and considered for UL multiplexing may be a HP PUCCH determined by SPS-PUCCH-AN-List in PUCCH-Config for HIP or n1PUCCH-AN in SPS-Config of HP based on the size of SPS HARQ-ACK bits that overlap in time with the corresponding transmission.

When the "deferred LP and/or HP HARQ-ACKs" have the same priority, that is, when the included HARQ-ACKs are associated with a single priority, if the deferred HARQ-ACK is an SPS HARQ-ACK, the PUCCH resource of the "deferred LP and/or HP HARQ-ACKs" to be considered in UL multiplexing may be a PUCCH resource determined by SPS-PUCCH-AN-List in PUCCH-Config or n1PUCCH-AN in SPS-Config of the corresponding priority based on the size of deferred SPS HARQ-ACK bits.

In some implementations of the present disclosure, when there are a plurality of slots for deferring HARQ-ACK transmission, that is, when there are a plurality of candidate target slots, the UE may perform the HARQ-ACK deferral operation using a slot that starts earlier in time among the plurality of slots.

Figure 17:
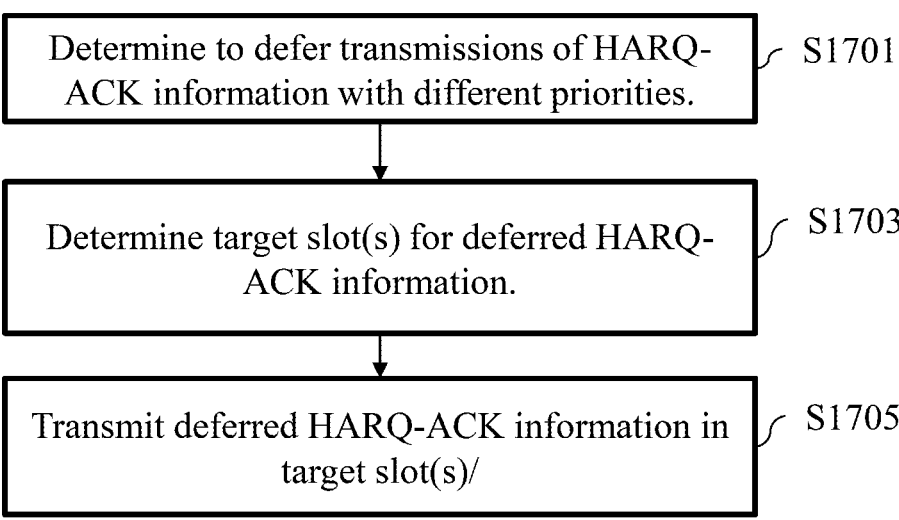
FIG. 17 illustrates a flow of HARQ-ACK deferral for transmission of HARQ-ACKs with different priorities according to some implementations of the present disclosure.

FIG. 17 illustrates a flow of HARQ-ACK deferral for transmission of HARQ-ACKs with different priorities according to some implementations of the present disclosure.

Referring to FIG. 17, the UE may determine whether to perform HARQ-ACK deferral for transmission of HARQ-ACK information with different priorities according to some implementations of the present disclosure (S1701). For example, if scheduled transmission of HP HARQ-ACK information overlaps with DL symbols (e.g., semi-static DL symbols, SSBs, and CORESET #0) in an original slot, the UE may perform the HARQ-ACK deferral for the HP HARQ-ACK transmission. If scheduled transmission of LP HARQ-ACK information overlaps with DL symbols (e.g., semi-static DL symbols, SSBs, and CORESET #0) in an original slot, the UE may perform the HARQ-ACK deferral for the LP HARQ-ACK transmission. The original slot in which the HP HARQ-ACK transmission is scheduled may be the same as or different from the original slot in which the LP HARRQ-ACK transmission is scheduled. The UE may determine target slot(s) for transmitting the deferred HP HARQ-ACK information and the deferred LP HARQ-ACK information (S1703). For example, the UE may determine a target slot according to Method A4-1 of the present disclosure. Alternatively, the UE may determine target slot(s) according to Method A4-2 of the present disclosure. The UE may transmit the deferred HP HARQ-ACK information and/or the deferred LP HARQ-ACK information in the determined target slot(s) (S1705).

BS Side

The above-described implementations of the present disclosure will be explained again from the perspective of the BS.

Figure 18:
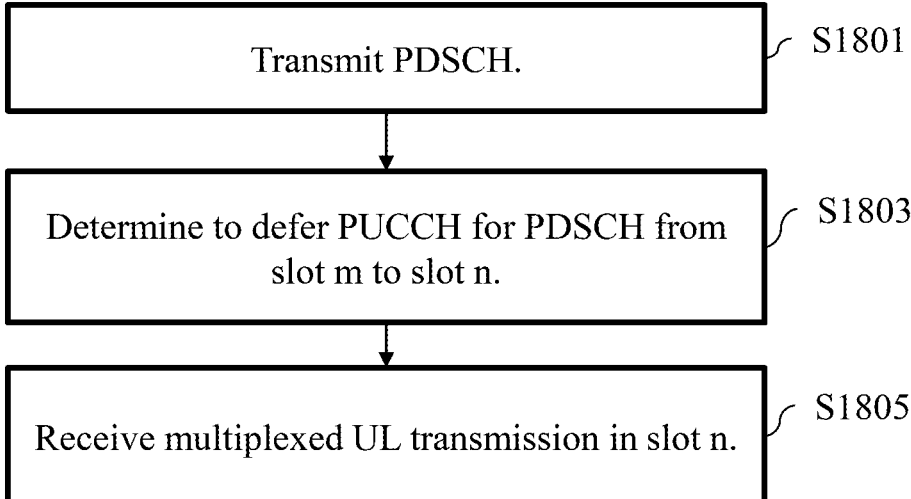
FIG. 18 illustrates an operational flow of a base station (BS) according to some implementations of the present disclosure.

FIG. 18 illustrates an operational flow of a BS according to some implementations of the present disclosure.

In some implementations, the BS may configure to the UE higher layer parameter(s) for determining PUCCH transmissions and slot formats thereof. Then, the BS may schedule a PDSCH to the UE in DL scheduling DCI or configure/activate an SPS PDSCH through higher layer configurations and DCI. The BS may transmit the scheduled (SPS) PDSCH (S1801) and receive a PUCCH in response to the scheduled (SPS) PDSCH. In addition, the BS may defer a specific PUCCH reception based on indicated or configured PUCCH receptions (S1803) and receive multiplexed UCI over a PUCCH determined based on the deferred PUCCH reception and other PUCCH receptions (S1805). For example, the UE may defer a specific PUCCH transmission based on indicated or configured PUCCH transmissions and multiplex the deferred PUCCH transmission with other PUCCH transmissions. The BS may receive a PUCCH or PUSCH expected to be transmitted by the UE based on the UE operation.

<Implementation B1> Determination of Availability of PUCCH for HARQ-ACK of SPS PDSCH Transmission When the UE is not allowed to transmit a HARQ-ACK response for a PDSCH received by the UE, the BS may assume that a PDSCH-to-HARQ-ACK feedback timing (hereinafter referred to as a HARQ timing) K1 of the corresponding HARQ-ACK response is deferred by $K1_{def}$ such that $K1'=K1+K1_{def}$, and thus, the received PDSCH has a new PDSCH-to-HARQ-ACK feedback timing of K1'. The BS may assume that the UE will use at least one of the following methods to determine whether the transmission of the HARQ-ACK response is allowed.

Method B1-1: For a specific PUCCH carrying a HARQ-ACK for SPS PDSCH reception, PUCCH A, it is determined that transmission of PUCCH A is not allowed if a PUCCH carrying HARQ-ACK feedback for an SPS PDSCH, which is used when it is assumed that there are no other PUCCHs in a given slot, satisfies the following conditions. For example, such a PUCCH may be a PUCCH for SPS HARQ-ACK transmission determined by PUCCH-config in SPS-PUCCH-AN-List, which is configuration information used to configure UE-specific PUCCH parameters, or n1PUCCH-AN in SPS-config, which is configuration information used to configure DL semi-persistent transmission, based on the size of SPS HARQ-ACK bits transmitted in the corresponding slot.

The above conditions may include when PUCCH A overlaps in time with at least one of the following symbols: semi-static DL symbols (e.g., a set of symbols indicated as DL by tdd-UL-DL-ConfigurationCommon or tdd-UL-DLConfigurationDedicated); semi-static flexible symbols (e.g., a set of symbols not indicated as either DL or UL by tdd-UL-DL-ConfigurationCommon or tdd-UL-DLConfigurationDedicated); SSB symbols (e.g., a set of symbols indicated to the UE by SIB1 or ssb-PositionslnBurst in ServingCellConfigCommon for reception of SS/PBCH blocks); and/or ORESET #0 (e.g., an MIB for a CORESET for Type0-PDCCH CSS set). For example, for specific SPS HARQ-ACK transmission, if the number of SPS HARQ-ACK bits to be transmitted without consideration of other PUCCH scheduling is X bits, PUCCH resource A may be selected from SPS-PUCCH-AN-List in the RRC configuration PUCCH-config. If one or more symbols occupied by selected PUCCH resource A are indicated as DL by the RRC configuration tdd-UL-DL-Configu- rationCommon, the UE and BS may determine that the SPS HARQ-ACK transmission is not allowed.

In some implementations of Method B1-1, if a CC (e.g., PUCCH cell) on which PUCCH transmission is to be performed is dynamically indicated or if such a CC changes for every PUCCH transmission according to a predetermined rule, the above conditions may be applied to CCs indicated by the BS for the PUCCH transmission or all CCs on which the PUCCH transmission is allowed. In other words, if the CCs indicated by the BS for the PUCCH transmission (if any) and all CCs on which the PUCCH transmission is allowed satisfy the above conditions, it may be determined that transmission of PUCCH A is not allowed.

Method B1-2: For a specific PUCCH carrying a HARQ-ACK for SPS PDSCH reception, PUCCH A, if a PUCCH used when multiplexing with other UL transmissions in a given slot is assumed satisfies the following conditions, it is determined that transmission of PUCCH A is not allowed.

The above conditions may include when PUCCH A overlaps in time with at least one of the following symbols: semi-static DL symbols (e.g., a set of symbols indicated as DL by tdd-UL-DL-ConfigurationCommon or tdd-UL-DLConfigurationDedicated); semi-static flexible symbols (e.g., a set of symbols not indicated as either DL or UL by tdd-UL-DL-ConfigurationCommon or tdd-UL-DLConfigurationDedicated); SSB symbols (e.g., a set of symbols indicated to the UE by SIB1 or ssb-PositionslnBurst in ServingCellConfigCommon for reception of SS/PBCH blocks); and/or ORESET #0 (e.g., an MIB for a CORESET for Type0-PDCCH CSS set).

In some implementations of Method B1-2, the "other UL transmissions" may be limited to PUCCH transmission or PUCCH transmission carrying a specific type of UCI. The specific type of UCI may be a HARQ-ACK, a HARQ-ACK and an SR, or a HARQ-ACK and CSI.

Alternatively, in some implementations of Method B1-2, the "other UL transmissions" may be limited to semi-statically configured PUCCH transmission. For example, the term "other UL transmissions" may be limited to an SR PUCCH occasion or periodic/quasi-persistent CSI. The reason for this is that considering PUCCH transmission indicated by dynamic scheduling, the UE needs to make a choice regarding the dynamic scheduling up to a specific time point in order to secure the processing time of the UE. Therefore, if the HARQ-ACK deferral operation is performed in consideration of PUCCH transmission indicated by dynamic scheduling, it may increase the complexity of the HARQ-ACK deferral operation and increase the implementation difficulty of the UE.

In some implementations of Method B1-2, when performing HARQ-ACK transmission for a dynamically scheduled PDSCH, the UE may expect that the BS will schedule PDSCHs such that HARQ-ACK transmission is always allowed and then determine that transmission of a HARQ-ACK response for the dynamically scheduled PDSCH in a scheduled slot is feasible. In other words, this method may be employed by assuming that PUCCH transmission indicated by the BS through dynamic scheduling is always enabled in a corresponding slot, thereby reducing the implementation difficulty of the UE.

As an example of Method B1-2, when the UE intends to transmit multiplexed UCI X bits on one or more overlapping PUCCH resources including an SPS HARQ-ACK PUCCH according to the method described in Section 9 of 3GPP TS 38.213, the UE may select PUCCH resource A. When one or more symbols occupied by selected PUCCH resource A are indicated as DL by the RRC configuration tdd-UL-DL-ConfigurationCommon, the UE and BS may determine that the SPS HARQ-ACK transmission is not allowed. When it is determined that the SPS HARQ-ACK transmission is not allowed, the UE may transmit all or some Y bits of the multiplexed UCI X bits on a deferred PUCCH resource. In this case, the Y bits may be SPS HARQ-ACK bit(s) among the X bits.

In some implementations of Method B1-2, if a CC (i.e., PUCCH cell) on which PUCCH transmission is to be performed is dynamically indicated or if such a CC changes for every PUCCH transmission according to a predetermined rule, the above conditions may be applied to CCs indicated by the BS for the PUCCH transmission or all CCs on which the PUCCH transmission is allowed. In other words, if the CCs indicated by the BS for the PUCCH transmission (if any) and all CCs on which the PUCCH transmission is allowed satisfy the above conditions, it may be determined that transmission of PUCCH A is not allowed.

<Implementation B2> Determination of PUCCH Resource for Deferred HARQ-ACK with UL Multiplexing When the UE is not allowed to transmit a HARQ-ACK response for a received PDSCH, the BS may assume that the UE will defer a PDSCH-to-HARQ-ACK feedback timing (hereinafter referred to as a HARQ timing) K1 of the corresponding HARQ-ACK response by $K1_{def}$ such that $K1'=K1+K1_{def}$. In other words, the BS may assume that the UE will defer the transmission of the corresponding HARQ-ACK response from a slot where the transmission is originally instructed/configured (hereinafter referred to as an original slot) to another slot (hereinafter referred to as a target slot) such that the received PDSCH has a new PDSCH-to-HARQ-ACK feedback timing of K1', where $K1_{def}$ may be an integer greater than 0. The BS may assume that the UE will multiplex and transmit UCI including the deferred HARQ-ACK with other UL transmissions in a target slot, which is determined based on the HARQ timing obtained from the HARQ deferral. In this case, a PUCCH resource for receiving the multiplexed UCI may be selected according to at least one of the following methods. The BS may select a different method depending on UCI to be received in the target slot.

Method B2-1: When the UE defers UCI including a HARQ-ACK to be transmitted in the original slot and transmits the deferred UCI in the target slot, slot n, the BS may assume that the UE will select a PUCCH resource according to the following procedures. The BS may receive the deferred UCI on the PUCCH resource expected to be selected by the UE within the target slot.

Procedure B2-1-1. Without considering the deferred PUCCH, the UE determines a PUCCH resource for transmission in consideration of the number of UCI bits to be transmitted after multiplexing with UL transmissions indicated/configured in slot n, an indicated PUCCH resource set, the type of UCI to be transmitted, etc. In this case, the method of in Section 9 of 3GPP TS 38.213 (e.g., Section 9 of 3GPP TS 38.213 Rel-15 or Rel-16) may be used.

Procedure B2-1-2. When one or more PUCCH resources determined by Procedure B2-1-1 overlap in time with a deferred PUCCH resource or when there is a PUCCH carrying a HARQ-ACK among the PUCCH resources determined by Procedure B2-1-1, the UE may transmit UCI bit(s) to be transmitted on the corresponding PUCCH resources together with deferred UCI bit(s). Otherwise, the UE independently transmits the deferred PUCCH resource. If the deferred HARQ-ACK is an SPS HARQ-ACK, the "deferred PUCCH resource" may be a PUCCH resource determined by SPS-PUCCH-AN-List in PUCCH-config or n1PUCCH-AN in SPS-config based on the size of deferred SPS HARQ-ACK bits (i.e., the number of deferred SPS HARQ-ACK bits). Alternatively, the "deferred PUCCH resource" may be a PUCCH resource selected to transmit UCI including a HARQ-ACK in the original slot, that is, a PUCCH resource selected in consideration of UL multiplexing in the original slot. For example, a PUCCH resource with the same PUCCH resource ID as the one selected considering UL multiplexing in the original slot may be used as the "deferred PUCCH resource." In some implementations, when the deferred PUCCH resource and two or more PUCCH resources determined by Procedure B2-1-1 overlap in time at the same time, the UE may transmit the deferred UCI bit(s) together on a PUCCH resource that starts earlier. The reason for this is to minimize the delay time of the deferred UCI bit(s). In some implementations, the UE may not expect to transmit the deferred UCI bit(s) together on a PUCCH resource carrying UCI with a size less than or equal to two bits. In some implementations, when the UE independently transmits the deferred PUCCH resource, the UE may expect that the total number of PUCCHs to be transmitted in the target slot including the deferred PUCCH resource is two or less. Furthermore, the UE may expect that other PUCCH transmissions in the target slot carry no HARQ-ACKs.

Procedure B2-1-3. If the PUCCH resource determined by Procedure B2-1-1 overlaps in time with PUSCH transmission, the UE may transmit the UCI bit(s) to be transmitted on the corresponding PUCCH resource, which are given by Procedure B2-1-2, on the overlapping PUSCH resource without performing the corresponding PUCCH transmission. To perform this procedure, the method of Section 9 of 3GPP TS 38.213 (e.g., Section 9 of 3GPP TS 38.213 Rel-15 or Rel-16) may be used.

Method B2-2: When the UE defers UCI including a HARQ-ACK to be transmitted in the original slot and transmits the deferred UCI in the target slot, the BS may assume that the UE will select a PUCCH resource according to the following procedures. The BS may receive the deferred UCI on the PUCCH resource expected to be selected by the UE within the target slot.

Procedure B2-2-1. The UE determines a PUCCH resource for transmission in consideration of the size of UCI bit(s) to be transmitted when the deferred UCI transmission (or a PUCCH resource on which the deferred UCI transmission is to be performed) is multiplexed with UL transmissions indicated/configured in slot n, an indicated PUCCH resource set, and the type of UCI to be transmitted. In this case, the method of Section 9 of 3GPP TS 38.213 (e.g., Section 9 of 3GPP TS 38.213 Rel-15 or Rel-16) may be used. If the deferred HARQ-ACK is an SPS HARQ-ACK, the PUCCH resource of the "deferred UCI transmission" to be considered for UL multiplexing may be a PUCCH resource determined by SPS-PUCCH-AN-List in PUCCH-config or n1PUCCH-AN in SPS-config based on the size of deferred SPS HARQ-ACK bits. Alternatively, the PUCCH resource of the "deferred UCI transmission" to be considered for UL multiplexing may be a PUCCH resource selected to transmit the corresponding UCI in the original slot, that is, a PUCCH resource selected in consideration of UL multiplexing in the original slot.

Procedure B2-2-2. If the PUCCH resource determined by Procedure B2-2-2 overlaps in time with PUSCH transmission, the UE may transmit the UCI bit(s) to be transmitted on the corresponding PUCCH resource on the overlapping PUSCH resource without performing the corresponding PUCCH transmission. To perform this procedure, the method of Section 9 of 3GPP TS 38.213 (e.g., Section 9 of 3GPP TS 38.213 Rel-15 or Rel-16) may be used.

Method B2-3: When the UE defers UCI including a HARQ-ACK to be transmitted in the original slot and transmits the deferred UCI in the target slot, the BS may assume that the UE will select PUCCH resources according to the following procedures. The BS may receive the deferred UCI on the PUCCH resource expected to be selected by the UE within the target slot.

Procedure B2-3-1. As if there is no deferred PUCCH, the UE determines a PUCCH resource for transmission in consideration of the size of UCI bit(s) to be transmitted after multiplexing with UL transmissions indicated/configured in slot n, an indicated PUCCH resource set, and the type of UCI to be transmitted. In this case, the method of Section 9 of 3GPP TS 38.213 (e.g., Section 9 of 3GPP TS 38.213 Rel-15 or Rel-16) may be used.

Procedure B2-3-2. When one or more PUCCH resources determined by Procedure B2-3-1 overlap in time with a deferred SPS HARQ-ACK PUCCH resource or when there is a PUCCH carrying a HARQ-ACK among the PUCCH resources determined by Procedure B2-3-1, the UE transmits deferred UCI bit(s) together on the corresponding resources according to at least one of the following conditions (Method B2-3-1). Alternatively, the UE may transmit UCI bit(s) of the UL transmissions indicated/configured in slot n together with the deferred UCI bit(s) on a PUCCH resource to be used when the deferred UCI transmission is multiplexed with the UL transmissions indicated/configured in slot n (Method B2-3-2). In some implementations, the UE may select Method B2-3-1 if PUCCH resource A carries UCI with a size greater than two bits. In some implementations, the UE may select Method B2-3-2 if PUCCH resource A carries UCI with a size less than or equal to two bits. In some implementations, if PUCCH resource A is a PUCCH resource determined by SPS-PUCCH-AN-List in PUCCH-config or n1PUCCH-AN in SPS-config, that is, a PUCCH resources carrying only an SPS HARQ-ACK, the UE may select Method B2-3-2. When Method B2-3-2 is used, if the deferred HARQ-ACK is an SPS HARQ-ACK, the PUCCH resource of the "deferred UCI transmission" to be considered for UL multiplexing may be a PUCCH resource determined by SPS-PUCCH-AN-List in PUCCH-config or n1PUCCH-AN in SPS-config based on the size of deferred SPS HARQ-ACK bits. When Method B2-3-2 is used, the PUCCH resource of the "deferred UCI transmission" to be considered for UL multiplexing may a PUCCH resource selected to transmit the corresponding UCI in the original slot, that is, a PUCCH resource selected in consideration of UL multiplexing in the original slot. When the deferred SPS HARQ-ACK PUCCH resource and two or more PUCCH resources determined by Procedure B2-3-1 overlap in time at the same time, the UE may transmit the deferred UCI bit(s) together on a PUCCH resource that starts earlier. The reason for this is to minimize the delay time of the deferred UCI bit(s).

Procedure B2-3-3. If the PUCCH resource determined by Procedure B2-3-1 overlaps in time with PUSCH transmission, the UE may transmit the UCI bit(s) to be transmitted on the corresponding PUCCH resource, which are given by Procedure B2-3-2, on the overlapping PUSCH resource without performing the corresponding PUCCH transmission. To perform this procedure, the method of Section 9 of 3GPP TS 38.213 (e.g., Section 9 of 3GPP TS 38.213 Rel-15 or Rel-16) may be used.

When Implementation B2 is applied, the BS may determine the earliest slot or subslot including available resources as the target slot for receiving deferred UCI, instead of selecting resources for receiving the deferred UCI in the determined target slot. That is, the BS may determine the target slot for the deferred reception based on the presence of resources for receiving the deferred HARQ-ACK.

<Implementation B3> Special Handling with Maximum Payload Size of PUCCH Resource Set When the UE is not allowed to transmit a HARQ-ACK response for a received PDSCH, the BS may assume that the UE will defer a PDSCH-to-HARQ-ACK feedback timing (hereinafter referred to as a HARQ timing) K1 of the corresponding HARQ-ACK response by $K1_{def}$ such that $K1'=K1+K1_{def}$. In other words, the BS may assume that the UE will defer the transmission of the corresponding HARQ-ACK response from a slot where the transmission is originally instructed/configured (hereinafter referred to as an original slot) to another slot (hereinafter referred to as a target slot) such that the received PDSCH has a new PDSCH-to-HARQ-ACK feedback timing of K1', where $K1_{def}$ may be an integer greater than 0. The BS may assume that the UE will multiplex and transmit UCI including the deferred HARQ-ACK with other UL transmissions in a target slot determined based on the HARQ timing obtained from the HARQ deferral and then receive the UCI and the other UL transmissions transmitted from the UE.

The UE and BS may determine a PUCCH resource on which deferred UCI transmission is multiplexed and transmitted together with UCI of another UL transmission according to Implementation A2/B2 or any method similar thereto. When the PUCCH resource is determined without consideration of deferred UCI as in Method A2-1/B2-1 of Implementation A2/B2, the maximum UCI bit size (e.g., maximum payload size maxPayloadSize) configured for the determined PUCCH resource or a PUCCH resource set including the determined PUCCH resource may become smaller than the number of actually transmitted UCI bit(s) including the deferred UCI. In this case, the following methods may be considered.

Method B3-1: The entirety of the deferred UCI may not be received. In this case, if the BS determines the PUCCH resource in consideration of the deferred UCI (e.g., if the BS selects the PUCCH resource set in consideration of the deferred UCI), the BS may determine the PUCCH resources again by excluding the deferred UCI.

Method B3-2: Some portions of the deferred UCI may not be received. In this case, the following methods may be considered.

Method B3-2-1: The BS may assume that the UE will transmit the deferred UCI by excluding CSI included in the deferred UCI (if any) until the UCI bits to be transmitted including the deferred UCI become smaller than the maximum UCI bit size and then received the deferred UCI.

Method B3-2-2: The BS may assume that the UE will transmit the deferred UCI by excluding SR(s) included in the deferred UCI (if any) until the UCI bits to be transmitted including the deferred UCI become smaller than the maximum UCI bit size and then received the deferred UCI.

Method B3-2-3: The BS may assume that the UE will transmit the deferred UCI by excluding HARQ-ACK(s) included in the deferred UCI (if any) until the UCI bits to be transmitted including the deferred UCI become smaller than the maximum UCI bit size and then received the deferred UCI. In this case, it is assumed that each HARQ-ACK bit is sequentially excluded depending on the transmission timing of a PDSCH associated with the corresponding HARQ- ACK bit. To ensure the maximum latency of services supported by a PDSCH, it may be assumed that a HARQ-ACK associated with the most recently transmitted PDSCH is excluded first. Alternatively, a HARQ-ACK associated with the earliest transmitted PDSCH may be excluded first to allow the UE to receive a PDSCH with the shortest latency. Excluding the HARQ-ACK associated with the earliest transmitted PDSCH from transmission enables dropping HARQ-ACK transmission for PDSCH reception exceeding the maximum latency and reducing the latency of meaningful transmission.

Method B3-2: The BS may assume that the UE will perform bit bundling at regular intervals (e.g., every two bits) to transmit a HARQ-ACK in the deferred UCI or a HARQ-ACK in UCI to be transmitted along with the deferred UCI.

Method B3-3: The BS may assume that the UE will not perform transmission on the corresponding PUCCH resource. Alternatively, the BS may perform scheduling such that the UCI bits to be received including the deferred UCI do not exceed the maximum UCI bit size (e.g., maxPayloadSize) configured for the PUCCH resource set.

<Implementation B4> Handling with/without Inter-UE Multiplexing Between Different Priorities When the UE is not allowed to transmit a HARQ-ACK response for a received PDSCH, the BS may assume that the UE will defer a PDSCH-to-HARQ-ACK feedback timing (hereinafter referred to as a HARQ timing) K1 of the corresponding HARQ-ACK response by $K1_{def}$ such that $K1'=K1+K1_{def}$. In other words, the BS may assume that the UE will defer the transmission of the corresponding HARQ-ACK response from a slot where the transmission is originally instructed/configured (hereinafter referred to as an original slot) to another slot (hereinafter referred to as a target slot) such that the received PDSCH has a new PDSCH-to-HARQ-ACK feedback timing of K1', where $K1_{def}$ may be an integer greater than 0.

For example, the BS may assume that the UE will multiplex and transmit UCI including the deferred HARQ-ACK with another UL transmission in a target slot determined based on the HARQ timing obtained from the HARQ deferral. As another example, if the transmission of the UCI including the deferred HARQ-ACK is allowed in a specific slot or if the transmission of the deferred HARQ-ACK is allowed in a specific slot even though the transmission of the UCI including the deferred HARQ-ACK is multiplexed with another UL transmission in the specific slot, the BS may assume that the UE will determine the earliest slot among those slots as the target slot and then multiplex and transmit the UCI including the deferred HARQ-ACK with another UL transmission in the determined target slot.

When the UE supports UL multiplexing between different priorities (i.e., inter-priority intra-UE multiplexing) and thus is capable of transmitting UCIs and/or UL-SCHs, which are scheduled by different HARQ-ACK codebook priorities or different priority indicators, on a single PUCCH and/or PUSCH resource, and when the UE is allowed to perform the HARQ-ACK deferral operation, the UE and BS may first consider the following.

1) Case 1: When transmission of a PUCCH on which HP UCI and LP UCI are multiplexed is not allowed, if one of the UCIs includes HARQ-ACK bit(s) for which the HARQ-ACK deferral operation is configured, Method B4a-1: The BS and UE may perform the deferral operation regardless of the priorities of the HARQ-ACK bit(s) for which the deferral operation is configured.

Method B4a-2: The BS and UE may perform the deferral operation only for HP HARQ-ACK bit(s) among the HARQ-ACK bit(s) for which the deferral operation is configured.

Method B4a-3: The BS and UE may perform the deferral operation only for LP HARQ-ACK bit(s) among the HARQ-ACK bit(s) for which the deferral operation is configured.

Method B4a-4: The BS and UE may perform the deferral operation only for HARQ-ACK bit(s) with the same priority as the PUCCH (e.g., HP PUCCH) on which the HP UCI and LP UCI are multiplexed among the HARQ-ACK bit(s) for which the deferral operation is configured.

Method B4a-5: Before inter-priority intra-UE multiplexing, the BS and UE may determine whether to perform the deferral operation based on a PUCCH where UL multiplexing is performed for each priority. For example, at least one of the following methods may be considered.

Method B4a-5-1: Before the inter-priority intra-UE multiplexing, if the BS and UE determine that transmission of a PUCCH carrying the HARQ-ACK bit(s) for which the deferral operation is configured is not allowed for the following reasons: the PUCCH is a PUCCH resource configured by the parameter n1PUCCH or the parameter SPS-PUCCH-AN-List-r16; and the PUCCH overlaps in time with semi-static DL symbols, SSBs, and CORESET #0, the BS and UE may perform the deferral operation for the corresponding HARQ-ACK bit(s).

Method B4a-6: The BS and UE may perform the deferral operation only when at least one HARQ-ACK bit(s) for which the deferral operation is configured is included in each of the HP UCI and LP UCI.

Method B4a-7: The BS and UE do not perform the deferral operation.

In some implementations, these methods (e.g., Method B4a-1 to Method B4a-7) may be limited to cases where a PUCCH on which HP and LP HARQ-ACKs are multiplexed is derived from a PUCCH resource for SPS HARQ-ACK transmission, for example, a PUCCH resource or a PUCCH resource set configured by the parameter n1PUCCH or the parameter SPS-PUCCH-AN-List-r16.

In some implementations, these operations (e.g., Method B4a-1 to Method B4a-7) may be limited to cases where a PUCCH on which HP and LP HARQ-ACKs are multiplexed is a HP PUCCH. In other words, the corresponding PUCCH may be a PUCCH resource set as HP or a resource used for a HARQ-ACK codebook indicated as HP.

In some implementations, when Method B4a-5 is applied, Method B4a-5 may be combined with Method B4a-1/B4a-2/B4a-3/B4a-4. For example, when Method B4a-2 and Method B4a-5 are combined, the BS and UE may determine whether to perform the deferral operation for HP HARQ-ACK bit(s) according to Method B4a-5 and may not perform the deferral operation for LP HARQ-ACK bit(s). As another example, when Method B4a-4 and Method B4a-5 are combined, the BS and UE may determine whether to perform the deferral operation for HARQ-ACK bit(s) of the same priority as a PUCCH (e.g., HP PUCCH) on which HP UCI and LP UCI are multiplexed according to Method A4a-5 and may not perform the deferral operation for HARQ-ACK bit(s) of different priorities.

2) Case 2: When transmission of a PUSCH on which HP and LP HARQ-ACKs are multiplexed is not allowed, Method B4b-1: The BS and UE do not perform the deferral operation.

Method B4b-2: Before inter-priority intra-UE multiplexing, the BS and UE may determine whether to perform the deferral operation based on a PUCCH where UL multiplexing is performed for each priority. For example, at least one of the following methods may be considered.

Method B4b-2-1: Before the inter-priority intra-UE multiplexing, if the BS and UE determine that transmission of a PUCCH carrying HARQ-ACK bit(s) for which the deferral operation is configured is not allowed for the following reasons: the PUCCH is a PUCCH resource configured by the parameter n1PUCCH or the parameter SPS-PUCCH-AN-List-r16; and the PUCCH overlaps in time with semi-static DL symbols, SSBs, and CORESET #0, the BS and UE may perform the deferral operation for the corresponding HARQ-ACK bit(s).

These operation(s) may be limited to cases where the PUSCH on which the HP and LP HARQ-ACKs are multiplexed is a HP PUSCH. In other words, the corresponding PUSCH may be a PUSCH resource set as HP or a PUSCH resource indicated as HP.

3) Case 3: When a HP PUCCH or HP PUSCH is prioritized and transmitted but a LP PUCCH or LP PUSCH and LP UCI are not prioritized and thus not transmitted after a process for multiplexing the HP PUCCH or HP PUCCH and the LP PUCCH or LP PUSCH, if the LP UCI includes HARQ-ACK bit(s) for which the HARQ-ACK deferral operation is configured, Method B4c-1: The BS and UE do not perform the deferral operation (for the LP UCI and LP PUCCH/PUSCH that are not transmitted).

Method B4c-2: Before inter-priority intra-UE multiplexing, the BS and UE may determine whether to perform the deferral operation based on a PUCCH where UL multiplexing is performed for each priority. For example, at least one of the following methods may be considered.

Method B4c-2-1: Before the inter-priority intra-UE multiplexing, if the BS and UE determine that transmission of a PUCCH carrying HARQ-ACK bit(s) for which the deferral operation is configured is not allowed for the following reasons: the PUCCH is a PUCCH resource configured by the parameter n1PUCCH or the parameter SPS-PUCCH-AN-List-r16; and the PUCCH overlaps in time with semi-static DL symbols, SSBs, and CORESET #0, the BS and UE may perform the deferral operation for the corresponding HARQ-ACK bit(s).

When the HARQ-ACK deferral operation is performed on a LP HARQ-ACK and/or a HP HARQ-ACK, there may be an issue regarding how to determine the earliest target slot/resource for the deferred LP HARQ-ACK and/or deferred HP HARQ-ACK.

In some implementations of the present disclosure, when a LP HARQ-ACK and/or a HP HARQ-ACK are subject to the deferral operation, the BS and UE may consider the following methods to determine the target slot/resource for the HARQ-ACK deferral operation.

Method B4-1: The UE/BS may defer HARQ-ACK transmission/reception to a slot or subslot including a PUSCH and/or PUCCH for carrying both a deferred LP HARQ-ACK and/or a deferred HP HARQ-ACK.

Referring to FIG. 16(a), when HP HARQ-ACK X1 and LP HARQ-ACK X2 in the original slot, slot m are subject to the HARQ-ACK deferral according to predetermined or predefined conditions, if a PUSCH and/or PUCCH for carrying all of deferred X1 and X2 and HP HAR-ACK Y1, which is scheduled to be transmitted in slot m+1, are present in slot m+1, where slot m+1 is next to slot m, the BS may determine slot m+1 as the target slot. Otherwise, the BS may determine whether deferred X1 and X2 and Y1 are capable of being received all together in slot m+2. If there is another HARQ-ACK scheduled to be received in slot m+2, the other HARQ-ACK may also be considered along with X1, X2 and Y1 in determining whether slot m+2 is used as the target slot.

In Method B4-1, PUSCH and/or PUCCH resources determined by the inter-priority intra-UE multiplexing process may be used to determine a PUSCH and/or PUCCH resource for transmitting both LP and/or HP HARQ-ACKs. For example, even when a PUCCH resource set for HP UCI scheduled by the BS to the UE in slot n is used to multiplex the scheduled HP UCI with a deferred HARQ-ACK, if a UL resource is allowed for transmission, the BS may defer reception of the HARQ-ACK from the UE to slot n. As another example, if an available LP/HP PUSCH resource scheduled by the BS in slot n overlaps with a PUCCH resource for a deferred HARQ-ACK or a PUCCH resource multiplexed with the deferred HARQ-ACK, the BS may defer reception of the HARQ-ACK from the UE to slot n.

Method B4-2: The BS and UE performs the HARQ-ACK deferral operation for a LP HARQ-ACK to be deferred and/or a HP HARQ-ACK to be deferred for each priority. For example, considering the priorities of deferred HARQ-ACKs, the BS may defer reception of HARQ-ACKs with the same priority to a slot or subslot including a PUSCH and/or PUCCH for carrying all the HARQ-ACKs with the corresponding priority. According to Method B4-2, the LP HARQ-ACK and HP HARQ-ACK may be deferred to different slots.

For example, when HP HARQ-ACK X1 and LP HARQ-ACK X2 in the original slot, slot m are subject to the HARQ-ACK deferral according to predetermined or predefined conditions, the BS may determine the target slot/target resource for each priority. Referring to FIG. 16(b), for HP, if a PUSCH and/or PUCCH for receiving both X1, which is the subject of the HARQ-ACK deferral, and HP HARQ-ACK Y1, which is scheduled to be transmitted in slot m+1, are present in slot m+1, where slot m+1 is next to slot m, the BS may determine slot m+1 as the target slot for reception of X1 and Y2. Otherwise, the BS may determine whether deferred X1 and Y1 are capable of being received together in the next slot, slot m+2. If there is another HP HARQ-ACK scheduled to be received in slot m+2, the other UCI may also be considered together with X1 and Y1 in determining whether the slot m+2 is used as the target slot for reception of the HP HARQ-ACKs. Referring to FIG. 16(b), for LP, if a PUSCH and/or PUCCH for receiving X2, which is the subject of the HARQ-ACK deferral, are present in slot m+1, where slot m+1 is next to slot m, the BS may determine slot m+1 as the target slot for transmission of X2. Otherwise, the BS may determine whether deferred X2 is capable of being transmitted in the next slot, slot m+2. If there is another LP HARQ-ACK, LP HARQ-ACK Y2 scheduled to be received in slot m+2, the other UCI, UCI Y2 may also be considered together with X2 in determining whether the slot m+2 is used as the target slot for reception of the LP HARQ-ACKs.

Method B4-2-1: In some implementations, the BS and UE may not consider the inter-priority intra-UE multiplexing in determining a PUSCH and/or PUCCH for carrying all HARQ-ACKs of the same priority. For example, when UL multiplexing is performed in a slot for each priority before the inter-priority intra-UE multiplexing, if a derived PUCCH or PUSCH does not overlap in time with semi-static DL symbols, SSBs, and CORESET #0, the BS may defer HARQ-ACK reception to the corresponding slot.

In some implementations of Method B4-2-1, when a PUCCH or PUSCH derived for a deferred HP HARQ-ACK and a PUCCH or PUSCH derived for a deferred LP HARQ-ACK overlap in time with each other within the same slot, if the UE is not configured to perform UCI multiplexing for different priorities, the UE may receive the deferred HP HARQ-ACK over the PUCCH or PUSCH derived for the deferred HP HARQ-ACK and drop transmission of the deferred LP HARQ-ACK. In some other implementations of Method A4-2-1, when a PUCCH or PUSCH derived for a deferred HP HARQ-ACK and a PUCCH or PUSCH derived for a deferred LP HARQ-ACK overlap in time with each other within the same slot, if the UE is configured to perform UCI multiplexing for different priorities, the UE may determine a PUCCH or PUSCH for multiplexing the deferred HP HARQ-ACK and deferred LP HARQ-ACK in the slot and then receive the deferred HP HARQ-ACK and deferred LP HARQ-ACK over the determined PUCCH or PUSCH. In some implementations, if the determined PUCCH or PUSCH overlaps in time with semi-static DL symbols, SSBs, and CORESET #0 in the slot, the BS may drop or skip receiving the deferred HP HARQ-ACK and deferred LP HARQ-ACK.

Method B4-2-2: In some implementations, the BS and UE may consider the inter-priority intra-UE multiplexing in determining a PUSCH and/or PUCCH for carrying all HARQ-ACKs of the same priority. For example, when the UE performs UL multiplexing in a slot for each priority before performing the inter-priority intra-UE multiplexing, if a derived PUCCH or PUSCH does not overlap in time with semi-static DL symbols, SSBs, and CORESET #0, and if the derived PUCCH or PUSCH does not overlap in time with another HP PUSCH and/or PUCCH, the BS may assume that the UE will defer HARQ-ACK transmission to the corresponding slot. Additionally, when the derived PUCCH or PUSCH overlaps in time with the other HP PUSCH and/or PUCCH, if a HP PUCCH and/or PUCCH determined to be transmitted after UL multiplexing with the corresponding HP PUCCH and/or PUSCH do not overlap with the semi-static DL symbols, SSBs, and CORESET #0, the BS may assume that the UE will defer the HARQ-ACK transmission to the corresponding slot. In some implementations, if the HP PUCCH and/or PUSCH determined to be transmitted after the UL multiplexing with the corresponding HP PUCCH and/or PUSCH overlaps the semi-static DL symbols, SSBs, and CORESET #0 due to the overlap in time between the derived PUCCH or PUSCH and the other HP PUSCH and/or PUCCH, the BS may determine whether to defer reception of HARQ-ACK(s) to a next slot.

When Method B4-2 is applied, if the HARQ-ACK(s) are dropped without being received due to the overlap in time with the other HP PUSCH and/or PUCCH and the UL multiplexing (i.e., inter-priority intra-UE multiplexing) with the corresponding HP PUCCH and/or PUSCH (for example, when a one-bit HP HARQ-ACK using PUCCH format 0 overlaps in time with a LP HARQ-ACK or when a HP SR overlaps in time with a LP HARQ-ACK using PUCCH format 2, 3 or 4), the BS may assume that the UE will determine that the corresponding slot is not suitable as the target slot/resource (that is the corresponding slot is invalid or non-available) and restart the HARQ-ACK deferral operation in another slot. Alternatively, the BS may assume that the UE will stop the deferral operation for the HARQ-ACK(s), which are not transmitted, and will not transmit the corresponding HARQ-ACK(s).

In some implementations of the present disclosure, if the deferred HARQ-ACK is an SPS HARQ-ACK, the PUCCH resource of "deferred LP and/or HP HARQ-ACKs" to be received and considered for UL multiplexing may be a HP PUCCH determined by SPS-PUCCH-AN-List in PUCCH-Config for HP or n1PUCCH-AN in SPS-Config of HP based on the size of SPS HARQ-ACK bits that overlap in time.

When the "deferred LP and/or HP HARQ-ACKs" have the same priority, that is, when the included HARQ-ACKs are associated with a single priority, if the deferred HARQ-ACK is an SPS HARQ-ACK, the PUCCH resource of the "deferred LP and/or HP HARQ-ACKs" to be considered in UL multiplexing may be a PUCCH resource determined by SPS-PUCCH-AN-List in PUCCH-Config or n1PUCCH-AN in SPS-Config of the corresponding priority based on the size of deferred SPS HARQ-ACK bits.

In some implementations of the present disclosure, when there are a plurality of slots for deferring HARQ-ACK transmission, that is, when there are a plurality of candidate target slots, the BS may perform the HARQ-ACK deferral operation using a slot that starts earlier in time among the plurality of slots.

Figure 19:
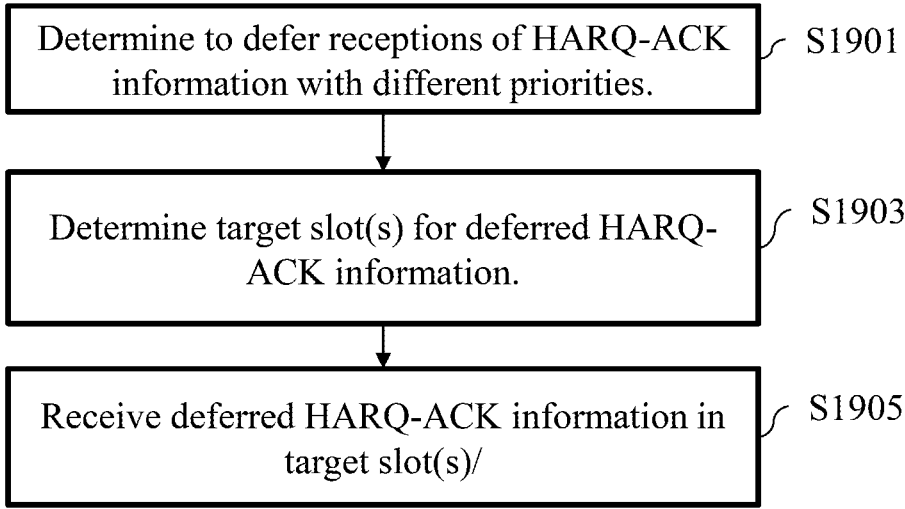
FIG. 19 illustrates a flow of HARQ-ACK deferral for reception of HARQ-ACKs with different priorities according to some implementations of the present disclosure.

FIG. 19 illustrates a flow of HARQ-ACK deferral for reception of HARQ-ACKs with different priorities according to some implementations of the present disclosure.

Referring to FIG. 19, the BS may determine whether to perform HARQ-ACK deferral for reception of HARQ-ACK information with different priorities according to some implementations of the present disclosure (S1901). For example, if scheduled reception of HP HARQ-ACK information overlaps with DL symbols (e.g., semi-static DL symbols, SSBs, and CORESET #0) in an original slot, the BS may perform the HARQ-ACK deferral for the HP HARQ-ACK transmission. If scheduled reception of LP HARQ-ACK information overlaps with DL symbols (e.g., semi-static DL symbols, SSBs, and CORESET #0) in an original slot, the BS may perform the HARQ-ACK deferral for the LP HARQ-ACK reception. The original slot in which the HP HARQ-ACK reception is scheduled may be the same as or different from the original slot in which the LP HARRQ-ACK reception is scheduled. The BS may determine target slot(s) for receiving the deferred HP HARQ-ACK information and the deferred LP HARQ-ACK information (S1903). For example, the BS may determine a target slot according to Method A4-1 of the present disclosure. Alternatively, the BS may determine target slot(s) according to Method A4-2 of the present disclosure. The BS may receive the deferred HP HARQ-ACK information and/or the deferred LP HARQ-ACK information in the determined target slot(s) (S1905).

In some implementations of the present disclosure, the BS may provide the UE with higher layer parameter(s) for determining PUCCH transmissions and slot formats thereof through an RRC configuration. The BS may schedule a PDSCH to the UE in DL scheduling DCI or configure an SPS PDSCH to the UE through higher layer configurations and DL scheduling DCI. Then, the BS may transmit the scheduled PDSCH. The UE may transmit a PUCCH to the BS in response to the PDSCH. In addition, the UE may defer a specific PUCCH transmission based on PUCCH transmissions indicated or configured by the BS and multiplex the deferred PUCCH transmission with other PUCCH transmissions. The BS may receive a PUCCH or PUSCH expected to be transmitted by the UE based on the UE operation.

According to some implementations of the present disclosure, the UE may determine whether a HARQ-ACK PUCCH resource for transmission is available. If the HARQ-ACK PUCCH resource is unavailable, the UE may transmit a corresponding PUCCH in a next available slot. In some implementations of the present disclosure, the UE may defer PUCCH transmission based on configurations by the BS, and the BS may accurately predict the operation of the UE without ambiguity and perform successful PUCCH or PUSCH reception. According to some implementations of the present disclosure, the HARQ-ACK deferral may be applied to HARQ-ACK PUCCHs of different priorities, and slot(s) for HARQ-ACK transmissions of different priorities may be determined.

The UE may perform operations according to some implementations of the present disclosure in association with transmission of HARQ-ACK information. The UE may include at least one transceiver; at least one processor; and at least one computer memory operably connectable to the at least one processor and storing instructions that, when executed, cause the at least one processor to perform operations according to some implementations of the present disclosure. A processing device for a UE may include at least one processor; and at least one computer memory operably connectable to the at least one processor and storing instructions that, when executed, cause the at least one processor to perform operations according to some implementations of the present disclosure. A computer readable (non-transitory) storage medium may store at least one computer program including instructions that, when executed by at least one processor, cause the at least one processor to perform operations according to some implementations of the present disclosure. A computer program or a computer program product may include instructions recorded in at least one computer readable (non-transitory) storage medium and causing, when executed, (at least one processor) to perform operations according to some implementations of the present disclosure.

For the UE, processing device, computer-readable (non-transitory) storage medium, and/or computer program product, the operations may include: determining HARQ-ACK deferral for HARQ-ACK information with different priorities; and determining a target slot for transmitting deferred HARQ-ACK information for each priority. For example, for the UE, processing device, computer-readable (non-transitory) storage medium, and/or computer program product, the operations may include: receiving first scheduling information related to a first priority and second scheduling information related to a second priority, wherein the second priority is higher than the first priority; receiving a first PDSCH based on the first scheduling information; receiving a second PDSCH based on the second scheduling information; generating first HARQ-ACK information with the first priority based on receiving the first PDSCH; generating second HARQ-ACK information with the second priority based on receiving the second PDSCH; determining a first slot for transmitting the first HARQ-ACK information based on a first PDSCH-to-HARQ-ACK_feedback timing value for the first PDSCH; determining a second slot for transmitting the second HARQ-ACK information based on a second PDSCH-to-HARQ-ACK_feedback timing value for the second PDSCH; based on the transmission of the first HARQ-ACK information overlapping with a downlink symbol in the first slot, deferring the transmission of the first HARQ-ACK information with the first priority to a third slot, wherein the third slot is later in time than the first slot; and based on the transmission of the second HARQ-ACK information overlapping with a downlink symbol in the second slot, deferring the transmission of the second HARQ-ACK information with the second priority to a fourth slot, wherein the fourth slot is later in time than the second slot.

In some implementations, each of the first PDSCH and the second PDSCH may be an SPS-based PDSCH.

In some implementations, the operations may include determining, as the third slot, the earliest slot in which a first physical UL channel for HARQ-ACK information with the first priority including the first HARQ-ACK information does not overlap with a DL symbol.

In some implementations, the first physical UL channel may be a PUCCH for an SPS configuration related to the first PDSCH.

In some implementations, the operations may include: based on the third slot being the same as the fourth slot, determining a third physical UL channel for multiplexing the first HARQ-ACK information and the second HARQ-ACK information; and based on the third physical UL channel not overlapping with DL symbols, transmitting the first HARQ-ACK information and the second HARQ-ACK information on the third physical UL channel in the third slot.

In some implementations, the third physical UL channel may be determined based on the number of bits in the first and second HARQ-ACK information and a PUCCH configuration for the second priority.

In some implementations, the operations may include determining, as the third slot, the earliest slot in which a first physical UL channel for HARQ-ACK information with the first priority including the first HARQ-ACK information does not overlap with DL symbols and the first physical UL channel does not overlap in time with a second physical UL channel with the second priority.

The BS may perform operations according to some implementations of the present disclosure in association with reception of HARQ-ACK information. The BS may include at least one transceiver; at least one processor; and at least one computer memory operably connectable to the at least one processor and storing instructions that, when executed, cause the at least one processor to perform operations according to some implementations of the present disclosure. A processing device for a BS may include at least one processor; and at least one computer memory operably connectable to the at least one processor and storing instructions that, when executed, cause the at least one processor to perform operations according to some implementations of the present disclosure. A computer readable (non-transitory) storage medium may store at least one computer program including instructions that, when executed by at least one processor, cause the at least one processor to perform operations according to some implementations of the present disclosure. A computer program or a computer program product may include instructions recorded in at least one computer readable (non-transitory) storage medium and causing, when executed, (at least one processor) to perform operations according to some implementations of the present disclosure.

For the BS, processing device, computer readable (non-transitory) storage medium, and/or computer program product, the operations may include: determining HARQ-ACK deferral for HARQ-ACK information with different priorities; and determining a target slot for receiving deferred HARQ-ACK information for each priority. For example, for the UE, processing device, computer readable (non-transitory) storage medium, and/or computer program product, the operations may include: transmitting first scheduling information related to a first priority and second scheduling information related to a second priority to the UE, wherein the second priority is higher than the first priority; transmitting a first PDSCH to the UE based on the first scheduling information; transmitting a second PDSCH to the UE based on the second scheduling information; determining a first slot for receiving first HARQ-ACK information with the first priority for the first PDSCH based on a first PDSCH-to-HARQ-ACK_feedback timing value for the first PDSCH; determining a second slot for receiving second HARQ-ACK information with the second priority for the second PDSCH based on a second PDSCH-to-HARQ-ACK_feedback timing value for the second PDSCH; based on the reception of the first HARQ-ACK information overlapping with DL symbols in the first slot, deferring the reception of the first HARQ-ACK information with the first priority to a third slot, wherein the third slot is later in time than the first slot; and based on the reception of the second HARQ-ACK information overlapping with DL symbols in the second slot, deferring the reception of the second HARQ-ACK information with the second priority to a fourth slot, wherein the fourth slot is later in time than the second slot.

In some implementations, each of the first PDSCH and the second PDSCH may be an SPS-based PDSCH.

In some implementations, the operations may include: determining, as the third slot, the earliest slot in which a first physical UL channel for HARQ-ACK information with the first priority including the first HARQ-ACK information does not overlap with DL symbols.

In some implementations, the first physical UL channel may be a PUCCH for an SPS configuration related to the first PDSCH.

In some implementations, the operations may include: based on the third slot being the same as the fourth slot, determining a third physical UL channel for multiplexing the first HARQ-ACK information and the second HARQ-ACK information; and based on the third physical UL channel not overlap with DL symbols, receiving the first HARQ-ACK information and the second HARQ-ACK information on the third physical UL channel in the third slot.

In some implementations, the third physical UL channel may be determined based on the number of bits in the first and second HARQ-ACK information and a PUCCH configuration for the second priority.

In some implementations, the operations may include determining, as the third slot, the earliest slot in which a first physical UL channel for HARQ-ACK information with the first priority including the first HARQ-ACK information does not overlap with DL symbols and the first physical UL channel does not overlap in time with a second physical UL channel with the second priority.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

The invention claimed is:

1. A method performed by a user equipment (UE), the method comprising:

receiving first scheduling information related to a first priority and second scheduling information related to a second priority, wherein the second priority is higher than the first priority;

receiving a first physical downlink shared channel (PDSCH) based on the first scheduling information;

receiving a second PDSCH based on the second scheduling information;

generating first hybrid automatic repeat request-acknowledgement (HARQ-ACK) information with the first priority based on receiving the first PDSCH;

generating second HARQ-ACK information with the second priority based on receiving the second PDSCH;

determining a first slot for a transmission of the first HARQ-ACK information based on a first PDSCH-to-HARQ-ACK feedback timing value for the first PDSCH;

determining a second slot for a transmission of the second HARQ-ACK information based on a second PDSCH-to-HARQ-ACK_feedback timing value for the second PDSCH;

based on the transmission of the first HARQ-ACK information overlapping with a downlink symbol in the first slot, determining a third slot to which the transmission of the first HARQ-ACK information with the first priority is deferred, wherein the third slot is later in time than the first slot; and based on the transmission of the second HARQ-ACK information overlapping with a downlink symbol in the second slot, determining a fourth slot to which the transmission of the second HARQ-ACK information with the second priority is deferred, wherein the fourth slot is later in time than the second slot, wherein the UE determines, as the third slot, an earliest slot in which a first physical uplink channel for third HARQ-ACK information with the first priority including the first HARQ-ACK information overlaps with no downlink symbol, and wherein the UE determines, as the fourth slot, an earliest slot in which a second physical uplink channel for fourth HARQ-ACK information with the second priority including the second HARQ-ACK information overlaps with no downlink symbol.

2. The method of claim 1, wherein each of the first PDSCH and the second PDSCH is a semi-persistent scheduling based PDSCH.

3. The method of claim 1, wherein the first physical uplink channel is a physical uplink control channel (PUCCH) for a semi-persistent scheduling configuration related to the first PDSCH.

4. The method of claim 1, comprising:

based on i) the third slot being identical to the fourth slot and ii) the first physical uplink channel for the third HARQ-ACK information with the first priority overlapping in time with the second physical uplink channel for the fourth HARQ-ACK information with the second priority, determining a third physical uplink channel for multiplexing the third HARQ-ACK information and the fourth HARQ-ACK information; and based on the third physical uplink channel overlapping with no downlink symbol, transmitting the third HARQ-ACK information and the fourth HARQ-ACK information over the third physical uplink channel in the third slot.

5. The method of claim 4, wherein the third physical uplink channel is determined based on a number of bits in the third and fourth HARQ-ACK information and a physical uplink control channel (PUCCH) configuration for the second priority.

6. A user equipment (UE) comprising:

at least one transceiver;

at least one processor; and at least one computer memory operably connected to the at least one processor and configured to store instructions that, when executed, cause the at least one processor to perform operations comprising:

receiving first scheduling information related to a first priority and second scheduling information related to a second priority, wherein the second priority is higher than the first priority;

receiving a first physical downlink shared channel (PDSCH) based on the first scheduling information;

receiving a second PDSCH based on the second scheduling information;

generating first hybrid automatic repeat request-acknowledgement (HARQ-ACK) information with the first priority based on receiving the first PDSCH;

generating second HARQ-ACK information with the second priority based on receiving the second PDSCH;

determining a first slot for a transmission of the first HARQ-ACK information based on a first PDSCH-to-HARQ-ACK_feedback timing value for the first PDSCH;

determining a second slot for a transmission of the second HARQ-ACK information based on a second PDSCH-to-HARQ-ACK_feedback timing value for the second PDSCH;

based on the transmission of the first HARQ-ACK information overlapping with a downlink symbol in the first slot, determining a third slot to which the transmission of the first HARQ-ACK information with the first priority is deferred, wherein the third slot is later in time than the first slot; and based on the transmission of the second HARQ-ACK information overlapping with a downlink symbol in the second slot, determining a fourth slot to which the transmission of the second HARQ-ACK information with the second priority is deferred, wherein the fourth slot is later in time than the second slot, wherein the UE determines, as the third slot, an earliest slot in which a first physical uplink channel for third HARQ-ACK information with the first priority including the first HARQ-ACK information overlaps with no downlink symbol, and wherein the UE determines, as the fourth slot, an earliest slot in which a second physical uplink channel for fourth HARQ-ACK information with the second priority including the second HARQ-ACK information overlaps with no downlink symbol.

7. A base station (BS) comprising:

at least one transceiver;

at least one processor; and at least one computer memory operably connected to the at least one processor and configured to store instructions that, when executed, cause the at least one processor to perform operations comprising:

transmitting, to a user equipment (UE), first scheduling information related to a first priority and second scheduling information related to a second priority, wherein the second priority is higher than the first priority;

transmitting, to the UE, a first physical downlink shared channel (PDSCH) based on the first scheduling information;

transmitting, to the UE, a second PDSCH based on the second scheduling information;

determining a first slot for a reception of first HARQ-ACK information with the first priority for the first PDSCH based on a first PDSCH-to-HARQ-ACK_feedback timing value for the first PDSCH;

determining a second slot for a reception of second HARQ-ACK information with the second priority for the second PDSCH based on a second PDSCH-to-HARQ-ACK feedback timing value for the second PDSCH;

based on the reception of the first HARQ-ACK information overlapping with a downlink symbol in the first slot, determining a third slot to which the reception of the first HARQ-ACK information with the first priority is deferred, wherein the third slot is later in time than the first slot; and based on the reception of the second HARQ-ACK information overlapping with a downlink symbol in the second slot, determining a fourth slot to which the reception of the second HARQ-ACK information with the second priority is deferred, wherein the fourth slot is later in time than the second slot, wherein an earliest slot in which a first physical uplink channel for third HARQ-ACK information with the first priority including the first HARQ-ACK information overlaps with no downlink symbol is determined as the third slot, and wherein an earliest slot in which a second physical uplink channel for fourth HARQ-ACK information with the second priority including the second HARQ-ACK information overlaps with no downlink symbol is determined as the fourth slot.

8. The BS of claim 7, wherein each of the first PDSCH and the second PDSCH is a semi-persistent scheduling based PDSCH.

9. The BS of claim 7, wherein the first physical uplink channel is a physical uplink control channel (PUCCH) for a semi-persistent scheduling configuration related to the first PDSCH.

10. The BS of claim 7, wherein the operations comprise:

based on i) the third slot being identical to the fourth slot and ii) the first physical uplink channel for the third HARQ-ACK information with the first priority overlapping in time with the second physical uplink channel for the fourth HARQ-ACK information with the second priority, determining a third physical uplink channel for multiplexing the third HARQ-ACK information and the fourth HARQ-ACK information; and based on the third physical uplink channel overlapping with no downlink symbol, receiving the third HARQ-ACK information and the fourth HARQ-ACK information on the third physical uplink channel in the third slot.

11. The BS of claim 10, wherein the third physical uplink channel is determined based on a number of bits in the third and fourth HARQ-ACK information and a physical uplink control channel (PUCCH) configuration for the second priority.

12. The UE of claim 6, wherein each of the first PDSCH and the second PDSCH is a semi-persistent scheduling based PDSCH.

13. The UE of claim 6, wherein the first physical uplink channel is a physical uplink control channel (PUCCH) for a semi-persistent scheduling configuration related to the first PDSCH.

14. The UE of claim 6, wherein the operations comprise:
based on i) the third slot being identical to the fourth slot and ii) the first physical uplink channel for the third HARQ-ACK information with the first priority overlapping in time with the second physical uplink channel for the fourth HARQ-ACK information with the second priority, determining a third physical uplink channel for multiplexing the third HARQ-ACK information and the fourth HARQ-ACK information; and
based on the third physical uplink channel overlapping with no downlink symbol, transmitting the third HARQ-ACK information and the fourth HARQ-ACK information over the third physical uplink channel in the third slot.

15. The UE of claim 14, wherein the third physical uplink channel is determined based on a number of bits in the third and fourth HARQ-ACK information and a physical uplink control channel (PUCCH) configuration for the second priority.

\*     \*     \*     \*     \*